(12) United States Patent
Kim et al.

(10) Patent No.: US 12,701,248 B2
(45) Date of Patent: Aug. 4, 2026

(54) DEVICE FOR PROCESSING IMAGE AND METHOD FOR OPERATING SAME USING NEURAL NETWORK-BASED COMPRESSION RATIO PREDICTION

(71) Applicant: SAMSUNG ELECTRONICS CO., LTD., Suwon-si (KR)

(72) Inventors: Dongchan Kim, Suwon-si (KR); Jinyoung Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 329 days.

(21) Appl. No.: 18/127,304

(22) Filed: Mar. 28, 2023

(65) Prior Publication Data

US 2023/0232026 A1     Jul. 20, 2023

Related U.S. Application Data

(63) Continuation of application No. PCT/KR2021/013118, filed on Sep. 27, 2021.

(30) Foreign Application Priority Data

Sep. 29, 2020     (KR) ........................ 10-2020-0127386

(51) Int. Cl.
*H04N 19/42*          (2014.01)
*G06V 10/74*          (2022.01)
          (Continued)

(52) U.S. Cl.
CPC ........... *H04N 19/42* (2014.11); *G06V 10/761* (2022.01); *G06V 10/7715* (2022.01);
          (Continued)

(58) Field of Classification Search
None
See application file for complete search history.

(56) References Cited

U.S. PATENT DOCUMENTS 8,295,647 B2    10/2012    Wang et al.
9,516,349 B2    12/2016    Gao et al.
          (Continued)

FOREIGN PATENT DOCUMENTS

CN          110555345 A     12/2019
CN          110766048 A     2/2020
          (Continued)

OTHER PUBLICATIONS

Heng, W.—"How to Assess the Quality of Compressed Surveillance Videos Using Face Recognition"—IEEE—Aug. 2019—pp. 2229-2243 (Year: 2019).*

(Continued)

*Primary Examiner* — Bernard Krasnic
(74) *Attorney, Agent, or Firm* — Sughrue Mion, PLLC

(57)          ABSTRACT

Provided are a device and operating method thereof for obtaining compression ratio information for recognizing a target object in an image using a deep neural network model, and compressing an image using the compression ratio information and encoding the compressed image. According to an embodiment of the present disclosure, there is provided a device that receives an image via at least one camera or a communication interface, obtains a feature map for detecting a target object in the received image, outputs a compression ratio for correctly recognizing the target object in the image by inputting the image and the feature map to a deep neural network model composed of pre-trained model parameters, and generates a bitstream by compressing the image using the output compression ratio and encoding the compressed image.

17 Claims, 10 Drawing Sheets

(51) Int. Cl.

| | | |
|---|---|---|
| *G06V 10/77* | (2022.01) | |
| *G06V 10/774* | (2022.01) | |
| *G06V 10/82* | (2022.01) | |
| *H04N 19/136* | (2014.01) | |
| *H04N 19/167* | (2014.01) | |

(52) U.S. Cl.
CPC ............ *G06V 10/774* (2022.01); *G06V 10/82* (2022.01); *H04N 19/136* (2014.11); *H04N 19/167* (2014.11)

(56) References Cited

U.S. PATENT DOCUMENTS

| | | | |
|---|---|---|---|
| 10,319,115 B2 | 6/2019 | Park et al. | |
| 10,728,553 B2 | 7/2020 | Xu et al. | |
| 10,869,036 B2 | 12/2020 | Coelho et al. | |
| 11,153,606 B2 | 10/2021 | Shi et al. | |
| 2009/0096927 A1 | 4/2009 | Camp, Jr. et al. | |
| 2017/0264902 A1 | 9/2017 | Ye et al. | |
| 2019/0095764 A1 | 3/2019 | Li et al. | |
| 2019/0132591 A1 | 5/2019 | Zhang et al. | |
| 2019/0281310 A1* | 9/2019 | Lee ...................... | H04N 19/117 |
| 2021/0034981 A1* | 2/2021 | Feng ........................ | G06N 3/08 |

FOREIGN PATENT DOCUMENTS

| | | | |
|---|---|---|---|
| JP | 2007-324856 A | 12/2007 | |
| JP | 2011-087090 A | 4/2011 | |
| JP | 2020-518191 A | 6/2020 | |
| JP | 7075013 B2 | 5/2022 | |
| KR | 10-2004-0062732 A | 7/2004 | |
| KR | 10-1572535 B1 | 11/2015 | |
| KR | 10-1704775 B1 | 2/2017 | |
| KR | 10-2018-0105294 A | 9/2018 | |
| KR | 10-2021-0157100 A | 12/2021 | |
| WO | 2020/036502 A1 | 2/2020 | |
| WO | WO-2021082428 A1 * | 5/2021 | ........... G06F 18/214 |

OTHER PUBLICATIONS

Communication issued Oct. 12, 2023 by the European Patent Office in European Patent Application No. 21875970.2.

Shinohara, Yusuke et al., "Video Compression Estimating Recognition Accuracy for Remote Site Object Detection", 2020 International Wireless Communications and Mobile Computing (IWCMC), IEEE, Jun. 15, 2020, pp. 285-290, XP033799719.

Shinohara Yusuke et al., "Video Compression Estimating Recognition Accuracy for Remote Site Object Detection", IWCMC, IEEE, pp. 285-290, XP033799719, Jun. 15, 2020.

Office Action issued Oct. 21, 2024 by the Korean Patent Office for Korean Patent Application No. 10-2020-0127386.

International Search Report (PCT/ISA/210) issued by the International Searching Authority on Jan. 4, 2022 in corresponding International Application No. PCT/KR2021/013118.

Written Opinion (PCT/ISA/237) issued by the International Searching Authority on Jan. 4, 2022 in corresponding International Application No. PCT/KR2021/013118.

Communication issued Jun. 4, 2025 by the European Patent Office in European Patent Application No. 21875970.2.

Communication dated Dec. 1, 2025, issued by the China National Intellectual Property Administration in Chinese Application No. 202180066370.3.

Communication dated May 30, 2026, issued by the China National Intellectual Property Administration in Chinese Application No. 202180066370.3.

\* cited by examiner

FIG. 5

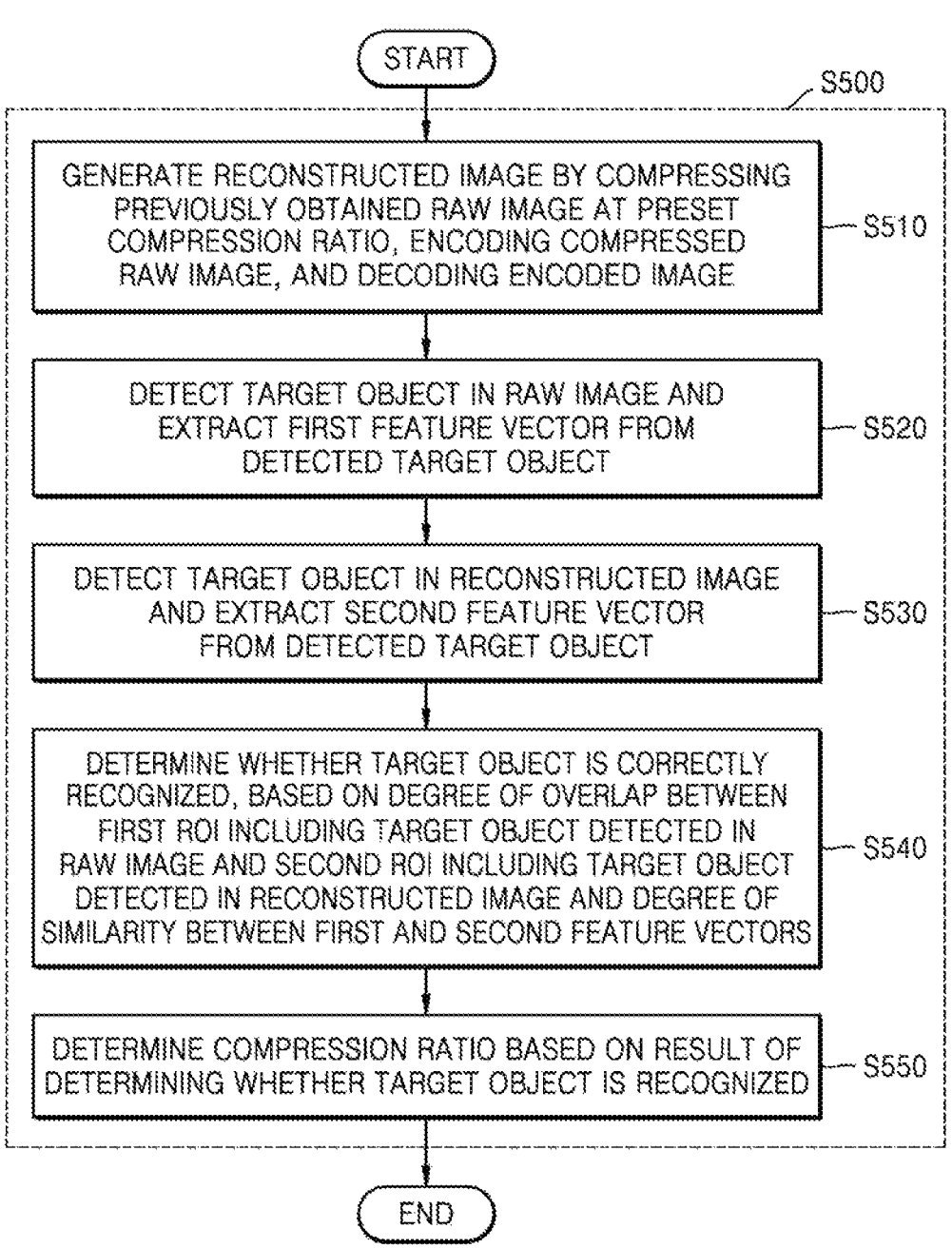

START

S500

GENERATE RECONSTRUCTED IMAGE BY COMPRESSING PREVIOUSLY OBTAINED RAW IMAGE AT PRESET COMPRESSION RATIO, ENCODING COMPRESSED RAW IMAGE, AND DECODING ENCODED IMAGE ——S510

DETECT TARGET OBJECT IN RAW IMAGE AND EXTRACT FIRST FEATURE VECTOR FROM DETECTED TARGET OBJECT ——S520

DETECT TARGET OBJECT IN RECONSTRUCTED IMAGE AND EXTRACT SECOND FEATURE VECTOR FROM DETECTED TARGET OBJECT ——S530

DETERMINE WHETHER TARGET OBJECT IS CORRECTLY RECOGNIZED, BASED ON DEGREE OF OVERLAP BETWEEN FIRST ROI INCLUDING TARGET OBJECT DETECTED IN RAW IMAGE AND SECOND ROI INCLUDING TARGET OBJECT DETECTED IN RECONSTRUCTED IMAGE AND DEGREE OF SIMILARITY BETWEEN FIRST AND SECOND FEATURE VECTORS ——S540

DETERMINE COMPRESSION RATIO BASED ON RESULT OF DETERMINING WHETHER TARGET OBJECT IS RECOGNIZED ——S550

END

FIG. 10

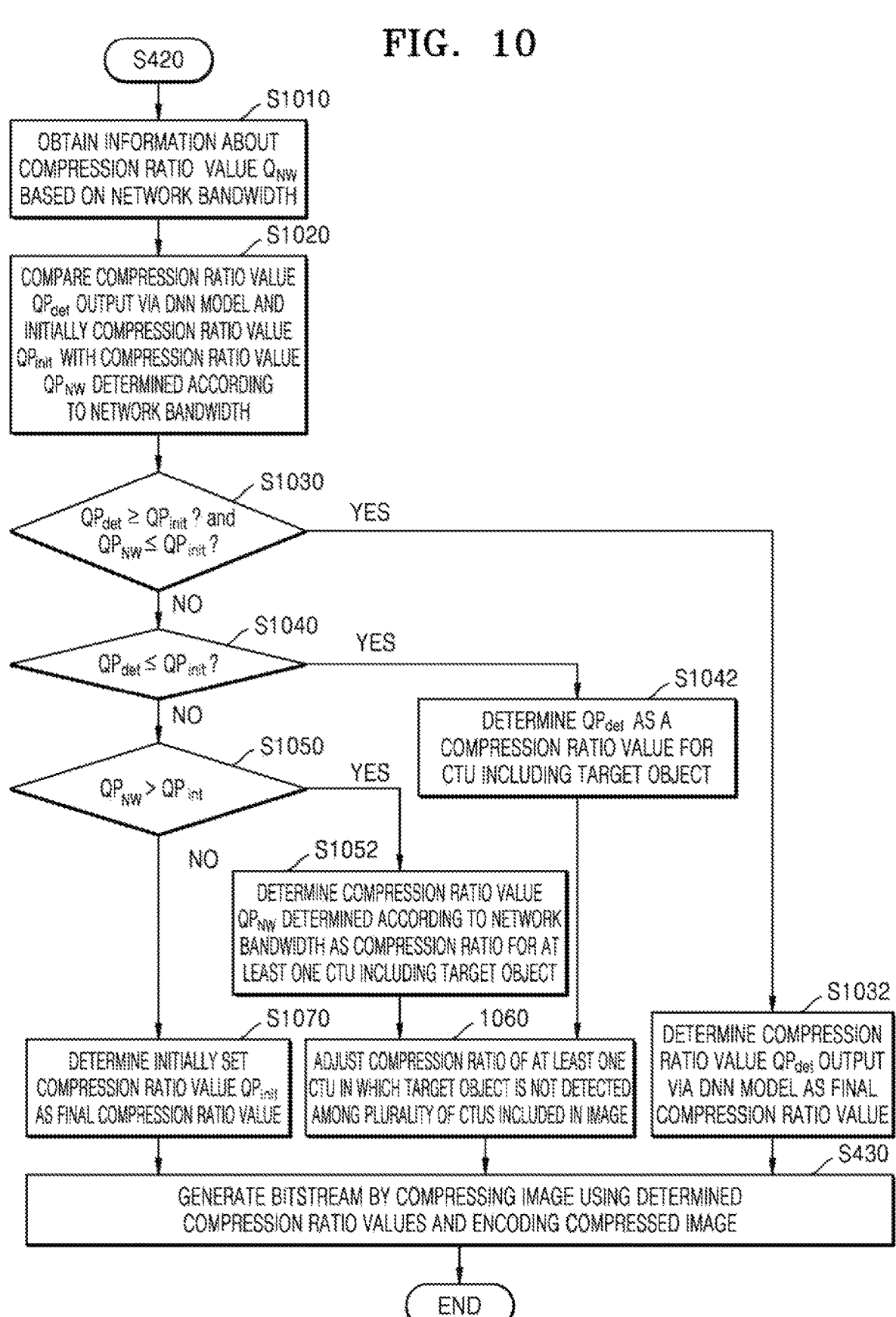

S420

OBTAIN INFORMATION ABOUT COMPRESSION RATIO VALUE $Q_{NW}$ BASED ON NETWORK BANDWIDTH — S1010

COMPARE COMPRESSION RATIO VALUE $QP_{det}$ OUTPUT VIA DNN MODEL AND INITIALLY COMPRESSION RATIO VALUE $QP_{init}$ WITH COMPRESSION RATIO VALUE $QP_{NW}$ DETERMINED ACCORDING TO NETWORK BANDWIDTH — S1020

$QP_{det} \geq QP_{init}$ ? and $QP_{NW} \leq QP_{init}$ ? — S1030

YES / NO $QP_{det} \leq QP_{init}$ ? — S1040

YES / NO

DETERMINE $QP_{det}$ AS A COMPRESSION RATIO VALUE FOR CTU INCLUDING TARGET OBJECT — S1042

$QP_{NW} > QP_{init}$ — S1050

YES / NO

DETERMINE COMPRESSION RATIO VALUE $QP_{NW}$ DETERMINED ACCORDING TO NETWORK BANDWIDTH AS COMPRESSION RATIO FOR AT LEAST ONE CTU INCLUDING TARGET OBJECT — S1052

DETERMINE INITIALLY SET COMPRESSION RATIO VALUE $QP_{init}$ AS FINAL COMPRESSION RATIO VALUE — S1070

ADJUST COMPRESSION RATIO OF AT LEAST ONE CTU IN WHICH TARGET OBJECT IS NOT DETECTED AMONG PLURALITY OF CTUS INCLUDED IN IMAGE — 1060

DETERMINE COMPRESSION RATIO VALUE $QP_{det}$ OUTPUT VIA DNN MODEL AS FINAL COMPRESSION RATIO VALUE — S1032

GENERATE BITSTREAM BY COMPRESSING IMAGE USING DETERMINED COMPRESSION RATIO VALUES AND ENCODING COMPRESSED IMAGE — S430

END

DEVICE FOR PROCESSING IMAGE AND METHOD FOR OPERATING SAME USING NEURAL NETWORK-BASED COMPRESSION RATIO PREDICTION

CROSS-REFERENCE TO RELATED APPLICATION

This application is a bypass continuation application of International Patent Application No. PCT/KR2021/013118, filed on Sep. 27, 2021, which claims priority from Korean Patent Application No. 10-2020-0127386, filed on Sep. 29, 2020, in the Korean Intellectual Property Office, the disclosures of which are incorporated herein by reference in their entireties.

BACKGROUND

1. Field

The present disclosure relates to a device for processing an image and an operating method thereof. More particularly, the present disclosure relates to a device for performing image processing for recognizing a target object in an image captured using a camera or obtained via a network.

2. Description of the Related Art

In many devices, image data is compressed using a compression standard (e.g., H.264/advanced video coding (AVC), high efficiency video coding (HEVC) (H.265), or the Joint Photographic Experts Group (JPEG)) to accommodate storage capacity constraints or network bandwidth limitations during transmission or storage. However, loss-compressed image data may result in degraded image quality when encoding is performed at an excessively high compression ratio, rendering the identification of recognizable features, such as a person's face, hairstyle, clothing, etc. challenging. Furthermore, in exceptional situations, such as a limited network bandwidth, data packet loss due to network instability, an error in an encoding operation, data packet loss in a user datagram protocol (UDP) environment, etc., a decoded image frame degrades, and a person's face and the like cannot be recognized in the degraded image frame. When the person's face cannot be accurately recognized in the degraded image frame, the person may be mistakenly recognized as another person, and thus, it is difficult to track an unauthorized person.

When the compression ratio is set low, there is a problem in that the storage capacity of image data is severely wasted, or network transmission is delayed, which makes real-time monitoring or the like impossible.

Therefore, it is necessary to determine an optimized compression ratio suitable for storage capacity constraints and network bandwidth limitations while accurately recognizing a target object from an image.

SUMMARY

The present disclosure relates to a device and operating method thereof for processing an image obtained by being captured by a camera or obtained via a network, and more particularly, to a device and operating method thereof for obtaining a compression ratio for correctly recognizing a target object in an image by using a trained DNN model and compressing and encoding the image by using the obtained compression ratio.

According to an aspect of the present disclosure, a method of processing an image, may provide: obtaining a feature map for detecting a target object in an image; predicting a compression ratio for recognizing the target object in the image via a neural network model by inputting the image and the feature map into the neural network model; and generating a bitstream by compressing the image based on the compression ratio and encoding the compressed image.

The neural network model may be trained using training data that include a plurality of training images, a plurality of feature maps extracted from the plurality of training images, and a plurality of ground-truth compression ratios for recognizing target objects respectively in the plurality of training images.

The training data may be generated by: generating a reconstructed image by compressing a training image at a preset compression ratio, encoding the compressed training image, and decoding the encoded image, for each of the plurality of training images; detecting a target object in the training image and extracting a first feature vector from the detected target object; detecting a target object in the reconstructed image and extracting a second feature vector from the detected target object; and determining a ground-truth compression ratio for recognizing the target object in the training image, based on a degree of overlap between a first region of interest (ROI) including the target object detected in the training image and a second ROI including the target object detected in the reconstructed image and a degree of similarity between the first feature vector and the second feature vector.

The determining of the ground-truth compression ratio may include: calculating the degree of overlap between the first ROI and the second ROI; calculating the degree of similarity between the first feature vector and the second feature vector; and comparing the calculated degree of overlap with a preset first threshold and comparing the calculated degree of similarity with a preset second threshold.

The determining of the ground-truth compression ratio may include changing the compression ratio to be lower than the preset compression ratio when the degree of overlap is less than or equal to the first threshold or the degree of similarity is less than or equal to the second threshold as a result of the comparing.

The determining of the ground-truth compression ratio may include determining the compression ratio used to generate the reconstructed image as a final compression ratio when the degree of overlap exceeds the first threshold and the degree of similarity exceeds the second threshold.

The training data may be generated further by: obtaining the plurality of feature maps and information about a plurality of maximum compression ratios; and storing, in a database, the plurality of training images, the plurality of feature maps, and the information about the plurality of maximum compression ratios.

A device for processing an image may include: at least one camera; a communication interface configured to connect the device to a server or another device for data communication; a memory storing a program including one or more instructions; and a processor configured to execute the one or more instructions of the program stored in the memory to: receive an image via the at least one camera or the communication interface; obtain a feature map for detecting a target object in the received image; predict a compression ratio for recognizing the target object in the image via a neural network model by inputting the image and the feature map to the neural network model; and generate a bitstream by compressing the image using the compression ratio and encoding the compressed image.

The neural network model may be trained using training data that include a plurality of training images, a plurality of feature maps extracted from the plurality of training images, and a plurality of ground-truth compression ratios for recognizing target objects respectively in the plurality of training images.

Model parameters of the neural network model may be obtained via a training process based on a loss between a plurality of predicted compression ratios and the plurality of ground-truth compression ratios for the plurality of training images.

The processor may be further configured to: generate a reconstructed image by compressing a training image at a preset compression ratio, encoding the compressed training image, and decoding the encoded image, for each of the plurality of training images; detect a target object in the training image and extract a first feature vector from the detected target object; detect a target object in the reconstructed image and extract a second feature vector from the detected target object; and determine a ground-truth compression ratio for recognizing the target object in the training image, based on a degree of overlap between a first region of interest (ROI) including the target object detected in the training image and a second ROI including the target object detected in the reconstructed image and a degree of similarity between the first feature vector and the second feature vector.

The processor may be further configured to calculate the degree of overlap between the first ROI and the second ROI, calculate the degree of similarity between the first feature vector and the second feature vector, and compare the calculated degree of overlap with a preset first threshold and compare the calculated degree of similarity with a preset second threshold.

The processor may be further configured to change the compression ratio to be lower than the preset compression ratio when the degree of overlap is less than or equal to the first threshold or the degree of similarity is less than or equal to the second threshold as a result of the comparing.

The processor may be further configured to determine the compression ratio used to generate the reconstructed image as a final compression ratio when the degree of overlap exceeds the first threshold and the degree of similarity exceeds the second threshold.

According to another aspect of the present disclosure, there is provided a non-transitory computer-readable storage medium storing a program that is executable by at least one processor to perform an image processing method. The image processing method may include: obtaining a feature map for detecting a target object in an image; outputting a compression ratio for recognizing the target object in the image by inputting the image and the feature map to a neural network model composed of trained model parameters; and generating a bitstream by compressing the image using the output compression ratio and encoding the compressed image.

According to another aspect of the present disclosure, a method of processing an image may include: obtaining a first feature map from a training image; inputting the first feature map to a neural network model to obtain a predicted compression ratio as an output of the neural network model; compressing the training image based on the predicted compression ratio, and performing encoding and decoding on the compressed training image to obtain a reconstructed image; detecting a target object from each of the training image and the reconstructed image; and updating model parameters of the neural network model based on either one or both of a similarity and an overlap degree between the target object detected from the training image and the target object detected from the reconstructed image.

The updating the model parameters of the neural network model may include: updating the model parameters of the neural network model based on the similarity between the target object detected from the training image and the target object detected from the reconstructed image, being less than a predetermined threshold.

The updating the model parameters of the neural network model may include: updating the model parameters of the neural network model based on the overlap degree between the target object detected from the training image and the target object detected from the reconstructed image, being less than a predetermined threshold.

The method may further include: predicting a new compression ratio via the neural network model having the updated model parameters by inputting a feature map of an image; and generating a bitstream by compressing the image based on the new compression ratio.

BRIEF DESCRIPTION OF THE DRAWINGS

The above and/or other aspects will be more apparent by describing certain example embodiments, with reference to the accompanying drawings, in which:

FIG. 5 is a flowchart of a method, performed by a device, of determining a compression ratio for correctly recognizing a target object in a raw image, according to an embodiment of the present disclosure;

FIG. 10 is a flowchart of a method, performed by a device, of comparing a compression ratio value determined via a DNN model with a compression ratio value determined according to a network bandwidth and an initially set compression ratio value and determining a value of a final compression ratio based on a comparison result, according to an embodiment of the present disclosure.

DETAILED DESCRIPTION

Figure 1:
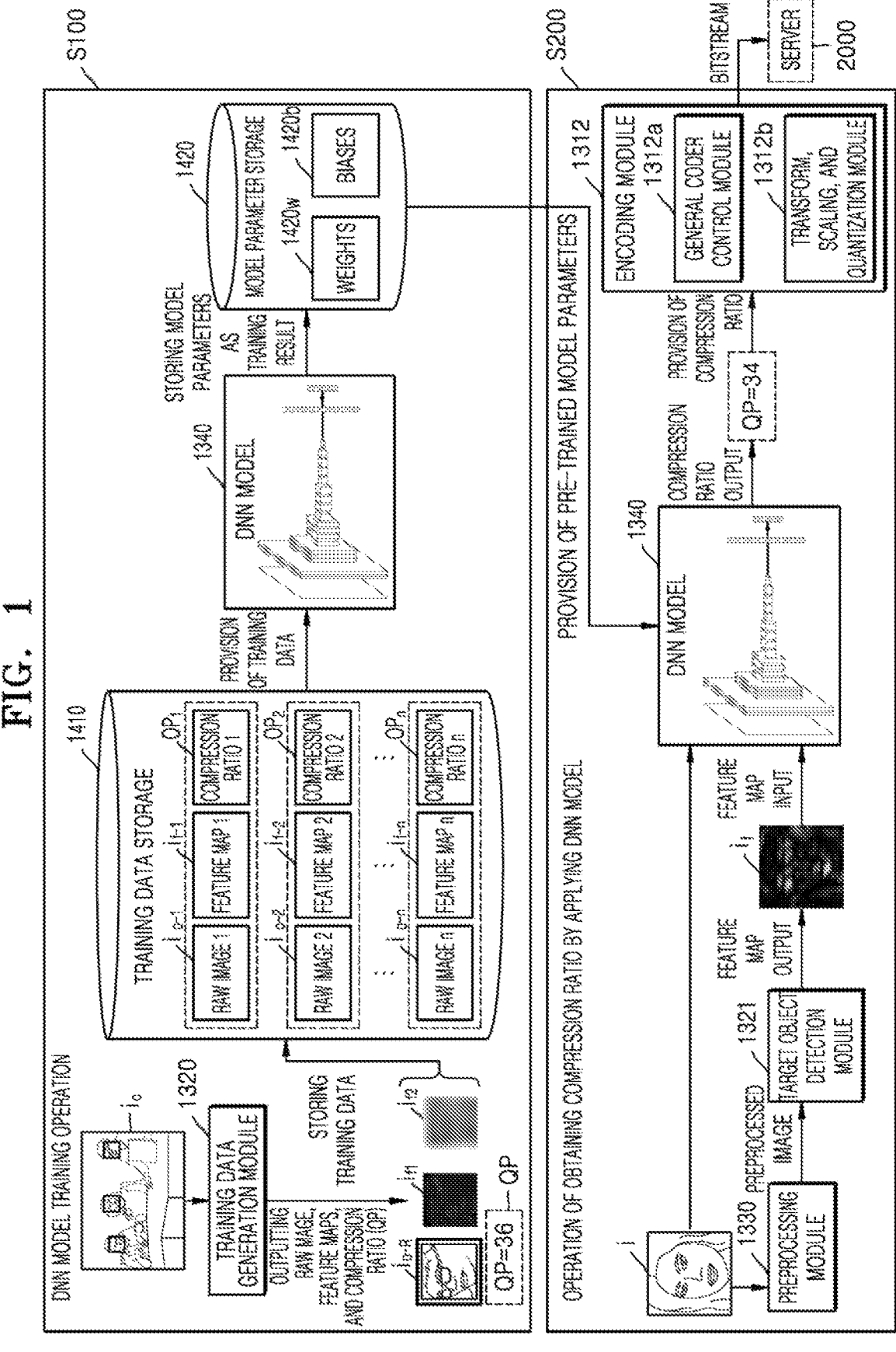
FIG. 1 is a conceptual diagram for describing image processing operations performed by a device, according to an embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As the terms used herein, general terms that are currently widely used are selected by taking functions in the present disclosure into account, but the terms may have different meanings according to an intention of one of ordinary skill in the art, precedent cases, advent of new technologies, etc. Furthermore, specific terms may be arbitrarily selected by the applicant, and in this case, the meaning of the selected terms will be described in detail in the detailed description of a corresponding embodiment. Thus, the terms used herein should be defined not by simple appellations thereof but based on the meaning of the terms together with the overall description of the present disclosure.

Singular expressions used herein are intended to include plural expressions as well unless the context clearly indicates otherwise. All the terms used herein, which include technical or scientific terms, may have the same meaning that is generally understood by a person of ordinary skill in the art.

Throughout the present disclosure, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation and may be embodied as hardware or software or a combination of hardware and software.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The expression "configured to (or set to)" used herein may be used interchangeably, according to context, with the expression such as "suitable for," "having the capacity to," "designed to," "adapted to," "made to," or "capable of". The term "configured to (or set to)" may not necessarily mean only "specifically designed to" in terms of hardware. Instead, the expression "a system configured to" may mean, in some contexts, the system being "capable of", together with other devices or components. For example, the expression "a processor configured to (or set to) perform A, B, and C" may mean a dedicated processor (e.g., an embedded processor) for performing corresponding operations or a general-purpose processor (e.g., a central processing unit (CPU) or an application processor (AP)) capable of performing the corresponding operations by executing one or more software programs stored in a memory.

In the present disclosure, an 'image' refers to a single image or a video including at least one frame. For example, an image may be obtained through capturing with a camera or obtained via a network.

In the present disclosure, a 'raw image' is uncompressed image data captured using a camera or obtained via a network.

In the present disclosure, a 'compression ratio' represents an image compression parameter for compressing a raw image by using a method that matches a standard specification. Compression ratios may exist in various forms for each standard specification. For example, in standards for compressing still images (e.g., Joint Photographic Experts Group (JPEG), JPEG-2000, JPEG-XR, WebP, etc.), a quantization table may be used to determine a compression ratio of an image. As another example, in standards for playing a video (e.g., H.264/advanced video coding (AVC), high efficiency video coding (HEVC) (H.265), etc.), a compression ratio of an image may be determined based on a quantization parameter.

In the present disclosure, a 'quantization parameter' is a parameter indicating a degree of quantization of transform coefficients defined in a standard (e.g., H.264/AVC or HEVC (H.265) related to compression of a video, and may be used to determine a compression ratio of an image. In an embodiment, a compression ratio is proportional to a value of a quantization parameter. For example, when the value of the quantization parameter is large, the compression ratio is high, and when the value of the quantization parameter is small, the compression ratio is low.

In the present disclosure, a 'transform coefficient' refers to a coefficient obtained by transforming residual data into a transform domain using various transformation techniques, the residual data representing a difference value between a raw image and a predicted image frame (I-frame) generated via intra-prediction using a spatial correlation or inter-prediction using a temporal correlation among a plurality of image frames. As a method of transforming residual data into transform coefficients in H.264/AVC, a discrete cosine transform (DCT), a Hadamard transform, etc. may be used.

FIG. 1 is a conceptual diagram for describing image processing operations performed by a device, according to an embodiment of the present disclosure.

Referring to FIG. 1, the image processing operations may include a training operation of training a deep neural network (DNN) model 1340 (S100) and an inference operation of predicting a compression ratio via the trained DNN model 1340 (S200).

The DNN model training operation S100 may include operations of generating training data from a raw image $i_o$, storing the generated training data in a training data storage 1410, training the DNN model 1340 using the training data, and storing, in a model parameter storage 1420, model parameters of the DNN model 1340, which are obtained via the training.

A training data generation module 1320 may be configured to receive a raw image $i_o$ and output a region of interest (ROI) image $i_{o-R}$ including a target object in the raw image $i_o$, feature maps $i_{f1}$ and $i_{f2}$ for detecting the target object from the raw image $i_o$, and a value of an optimal compression ratio QP for correctly recognizing the target object in the raw image $i_o$. Here, a target object refers to an object of interest that a user desires to detect in an image. The target object may include, for example, at least one of a person's face, hair, clothing, and posture. The raw image $i_o$, feature maps $i_{f1}$ and $i_{f2}$, and the optimal compression ratio QP may be referred to as training data.

The feature maps $i_{f1}$ and $i_{f2}$ are images respectively including feature vectors extracted to detect the target object in the raw image $i_o$. The feature maps $i_{f1}$ and $i_{f2}$ may be one or a plurality of feature maps. A feature map may include, for example, at least one of an edge map, a blur image, and a circular map. The feature maps $i_{f1}$ and $i_{f2}$ may be obtained using a known image processing technique or via training using a deep learning-based neural network model. In an embodiment, in the case of using a convolutional neural network (CNN) model, the device may perform a convolution on the raw image $i_o$ by using a filter having a preset size and a preset number of channels, extract two-dimensional (2D) image layers having the same number of filters based on convolution results, and obtain the feature maps $i_{f1}$ and $i_{f2}$, each being composed of 2D image layers.

The training data generation module 1320 may determine an optimal compression ratio QP for correctly recognizing a target object in a reconstructed image. To determine the optimal compression ratio, the raw image $i_o$ is compressed at a preset compression ratio, encoded, and then decoded. An 'optimal compression ratio for correctly recognizing a target object' may refer to a maximum compression ratio capable of maintaining an error rate of recognition of the target object below a preset error rate. In an embodiment, the training data generation module 1320 may respectively detect target objects in the raw image $i_o$ and the reconstructed image, extract feature vectors from the detected target objects, and determine an optimal compression ratio QP for correctly recognizing the target object in the raw image $i_o$ by using information about a degree of overlap between a first ROI including the target object detected in the raw image $i_o$ and a second ROI including the target object detected in the reconstructed image and a degree of similarity between a first feature vector extracted from the raw image $i_o$ and a second feature vector extracted from the reconstructed image.

Here, a 'compression ratio' represents an image compression parameter for encoding the raw image $i_o$ by using a method that matches a standard specification. Compression ratios may exist in various forms for each standard specification. For example, in standards for compressing still images (e.g., JPEG, JPEG-2000, JPEG-XR, WebP, etc.), a quantization table may be used to determine the degree of compression of an image. As another example, in standards for playing a video (e.g., H.264/AVC, HEVC (H.265), etc.), a compression ratio of an image may be determined based on a quantization parameter.

A 'quantization parameter' is a parameter indicating a degree of quantization of transform coefficients defined in a standard (e.g., JPEG) related to compression of still images or a standard (e.g., H.264/AVC or HEVC (H.265) related to compression of a video, and may be used to determine a compression ratio of an image. In an embodiment, a compression ratio is proportional to a value of a quantization parameter. For example, when the value of the quantization parameter is large, the compression ratio is high, and when the value of the quantization parameter is small, the compression ratio is low.

An 'optimal compression ratio for correctly recognizing a target object' means an optimal compression ratio value that results in an error rate less than a preset threshold value in the process of detecting the target object. In the embodiment shown in FIG. 1, a value of the compression ratio QP for correctly recognizing the target object in the raw image $i_o$ may be 36.

Figure 2:
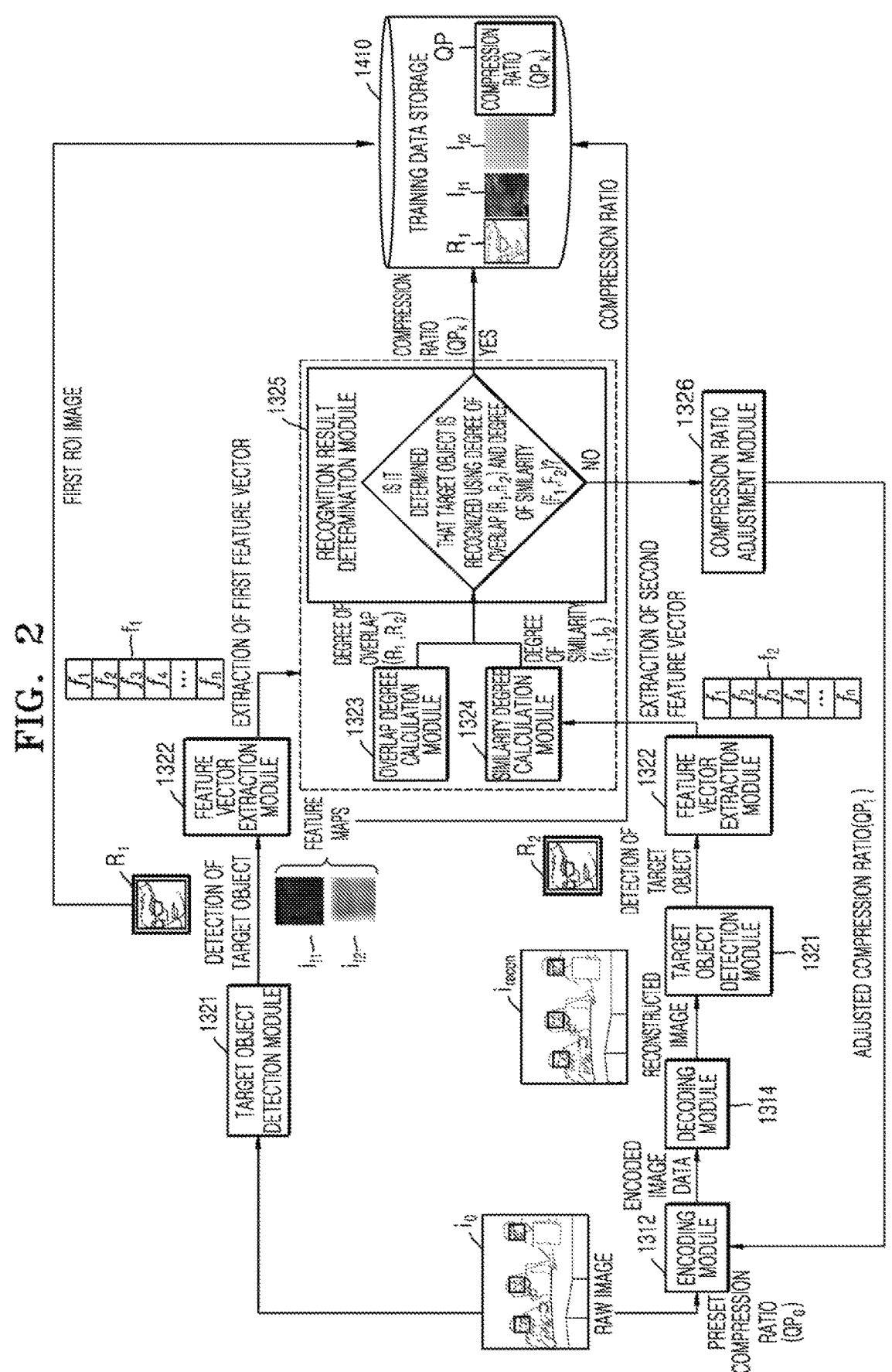
FIG. 2 is a diagram illustrating a method, performed by a device, of determining a compression ratio from a raw image and storing the raw image and information about the determined compression ratio, according to an embodiment of the present disclosure.

In an embodiment, the training data generation module 1320 may include a target object detection module (1321 of FIG. 2), a feature vector extraction module (1322 of FIG. 2), an overlap degree calculation module (1323 of FIG. 2), a similarity degree calculation module (1324 of FIG. 2), a recognition result determination module (1325 of FIG. 2), and a compression ratio adjustment module (1326 of FIG. 2). A specific embodiment in which the training data generation module 1320 determines a value of an optimal compression ratio for correctly recognizing the target object in the raw image $i_o$ will be described in detail below with reference to FIG. 2.

By performing the above-described operations on each of a plurality of raw images $i_{o-1}$ to $i_{o-n}$ previously obtained, the training data generation module 1320 may determine values of compression ratios $QP_1$ to $QP_n$ for correctly recognizing target objects respectively in the plurality of raw images $i_{o-1}$ to $i_{o-n}$. In an embodiment, each of the plurality of raw images $i_{o-1}$ to $i_{o-n}$ may be an ROI image including a target object. The plurality of raw images $i_{o-1}$ to $i_{o-n}$, and a plurality of feature maps $i_{f-1}$ to $i_{f-n}$ and a plurality of compression ratio values $QP_1$ to $QP_n$ obtained by the training data generation module 1320 may be stored in the training data storage 1410. In an embodiment, the plurality of raw images $i_{o-1}$ to $i_{o-n}$, the plurality of feature maps $i_{f-1}$ to $i_{f-n}$, and the plurality of compression ratio values $QP_1$ to $QP_n$ may be stored as a key-value type in the training data storage 1410. That is, the plurality of raw images $i_{o-1}$ to $i_{o-n}$, the plurality of feature maps $i_{f-1}$ to $i_{f-n}$, and the plurality of compression ratio values $QP_1$ to $QP_n$ form pairs of pieces of related information and stored as key-value pairs in the training data storage 1410. For example, a key that is the first raw image $i_{o-1}$ and the first feature map $i_{f-1}$ extracted from the first raw image $i_{o-1}$ may be paired with a value that is the first compression ratio value $QP_1$ determined from the first raw image $i_{o-1}$, and the key-value pair may be stored in the training data storage 1410. Similarly, a key that is the second raw image $i_{o-2}$ and the second feature map $i_{f-2}$ extracted from the second raw image $i_{o-2}$ may be paired with a value that is the second compression ratio value $QP_2$ determined from the second raw image $i_{o-2}$, and the key-value pair may be stored in the training data storage 1410.

The DNN model 1340 is an artificial intelligence (AI) model configured to perform training using training data provided from the training data storage 1410. In an embodiment, the DNN model 1340 may perform supervised learning where the plurality of raw images $i_{o-1}$ to $i_{o-n}$ and the plurality of feature maps $i_{f-1}$ to $i_{f-n}$ prestored in the training data storage 1410 are applied as an input and labels related to the plurality of compression ratio values $QP_1$ to $QP_n$ are applied as ground-truth. In an embodiment, the DNN model 1340 may include a plurality of hidden layers that are interior layers that perform calculations. The DNN model 1340 may include, for example, at least one of a CNN, a recurrent neural network (RNN), a restricted Boltzmann machine (RBM), a deep belief network (DBN), a bidirectional recurrent DNN (BRDNN), and deep Q-networks (DQN). However, the DNN model 1340 is not limited to the above-described example, and may include all known deep learning-based neural network models.

When the DNN model 1340 is implemented as a CNN model, in the training operation (S100), the device may extract feature values by striding over the plurality of raw images $i_{o-1}$ to $i_{o-n}$ applied as an input by using a filter having a preset size and a preset number of channels, obtain a plurality of layers including the extracted feature values, and obtain a feature vector map by applying weights to the plurality of layers. A rectified linear unit (ReLU) model may be used in the process of obtaining the feature vector map, and in order to improve efficiency, operations of regularizing a learning model through dropout and performing pooling or max pooling may be further added. Subsequently, feature values obtained through the pooling or max pooling are integrated via a fully connected layer, and the DNN model 1340 may be trained to output labels related to compression ratio values via activation functions including softmax, sigmoid, and hyperbolic tangent.

The DNN model 1340 may obtain model parameters via training. In an embodiment, when the DNN model 1340 is implemented as a CNN model, the DNN model 1340 may obtain model parameters including weights 1420$w$ and biases 1420$b$ between a plurality of layers via supervised learning. Here, a 'weight 1420$w$' and a 'bias 1420$b$' are parameters for inferring output labels (compression ratio values) from input data (a plurality of raw images and a plurality of feature maps), and values thereof may be adjusted as training is performed. The weights 1420$w$ and the biases 1420$b$ obtained via training of the DNN model 1340 may be stored in the model parameter storage 1420.

Operation S200 of the device obtaining a compression ratio using the DNN model 1340 may include operations of receiving an image i via a camera or a network, outputting a compression ratio based on the image i by using the DNN model 1340, and generating a bitstream by compressing the image i using the output compression ratio and encoding the compressed image.

The image i may be input to a preprocessing module 1330, and the preprocessing module 1330 performs preprocessing on the input image i. The preprocessing module 1330 may be configured to resize the input image i to a preset size and normalize brightness and contrast of the image i. The image preprocessed by the preprocessing module 1330 may be input to the target object detection module 1321.

The target object detection module 1321 may detect a target object in an image. In an embodiment, the target object detection module 1321 may be configured to detect a target object in the image i using an AI model including deep learning. In an embodiment, the target object detection module 1321 may detect a target object in the image i by performing training using a CNN model. For example, when the target object is a face, the target object detection module 1321 may detect a person's face in a video by using a large scale dataset, such as CASIA-WebFace, VGGFace/VGG-Face2, or MS-Celeb-1M. In an embodiment, the target object detection module 1321 may include a MobileNet trained to perform face recognition using the VGGFace2 dataset.

The target object detection module 1321 may output a feature map $i_f$ in the process of detecting the target object in the image i. The 'feature map $i_f$' is an image including a feature vector extracted to detect the target object in the image i, and may include, for example, at least one of an edge map, a blur image, and a circular map.

By performing training using, as an input, the image i obtained via the camera or network and the feature map $i_f$ extracted from the image i, the DNN model 1340 may output a compression ratio for correctly recognizing the target object in the image i. The DNN model 1340 may receive trained model parameters from the model parameter storage 1420 and apply the received model parameters to the input image i and the feature map $i_f$, thereby outputting a compression ratio value. In the embodiment shown in FIG. 1, a value of the compression ratio for correctly recognizing the target object in the image i may be 34. The DNN model 1340 may provide information about the output compression ratio to an encoding module 1312.

The encoding module 1312 is configured to generate an encoded bitstream by compressing and encoding the input image i. In an embodiment, the encoding module 1312 may obtain prediction data from a raw image via inter-prediction and intra-prediction, obtain residual data produced by subtracting the prediction data from the raw image, and obtain encoded image data by performing transform and quantization on the residual data. For example, the encoded image data may be quantized transform coefficients.

The encoding module 1312 may include a general coder control module 1312$a$ and a transform, scaling and quantization module 1312$b$. The general coder control module 1312$a$ may set encoding parameters for data to be encoded. The transform, scaling, and quantization module 1312$b$ may transform a block of a certain size included in the image i by using transform coefficients. In an embodiment, the transform, scaling, and quantization module 1312$b$ may transform a block by using a discrete cosine transform (DCT) and a discrete sine transform (DST), based on information obtained from the general coder control module 1312$a$. For example, a block may have a size between 4×4 and 32×32 pixels. In an embodiment, the transform, scaling, and quantization module 1312$b$ may set a normalization value of transform coefficients to be greater than 1 and scale a value of an encoded image accordingly. In an embodiment, the transform, scaling and quantization module 1312$b$ may quantize the transformed data based on the compression ratio value.

In an embodiment, the encoding module 1312 may generate a bitstream by compressing the image i using information about the compression ratio output from the DNN model 1340 (in the embodiment of FIG. 2, the value of the compression ratio is 34) and encoding the compressed image.

Figure 3:
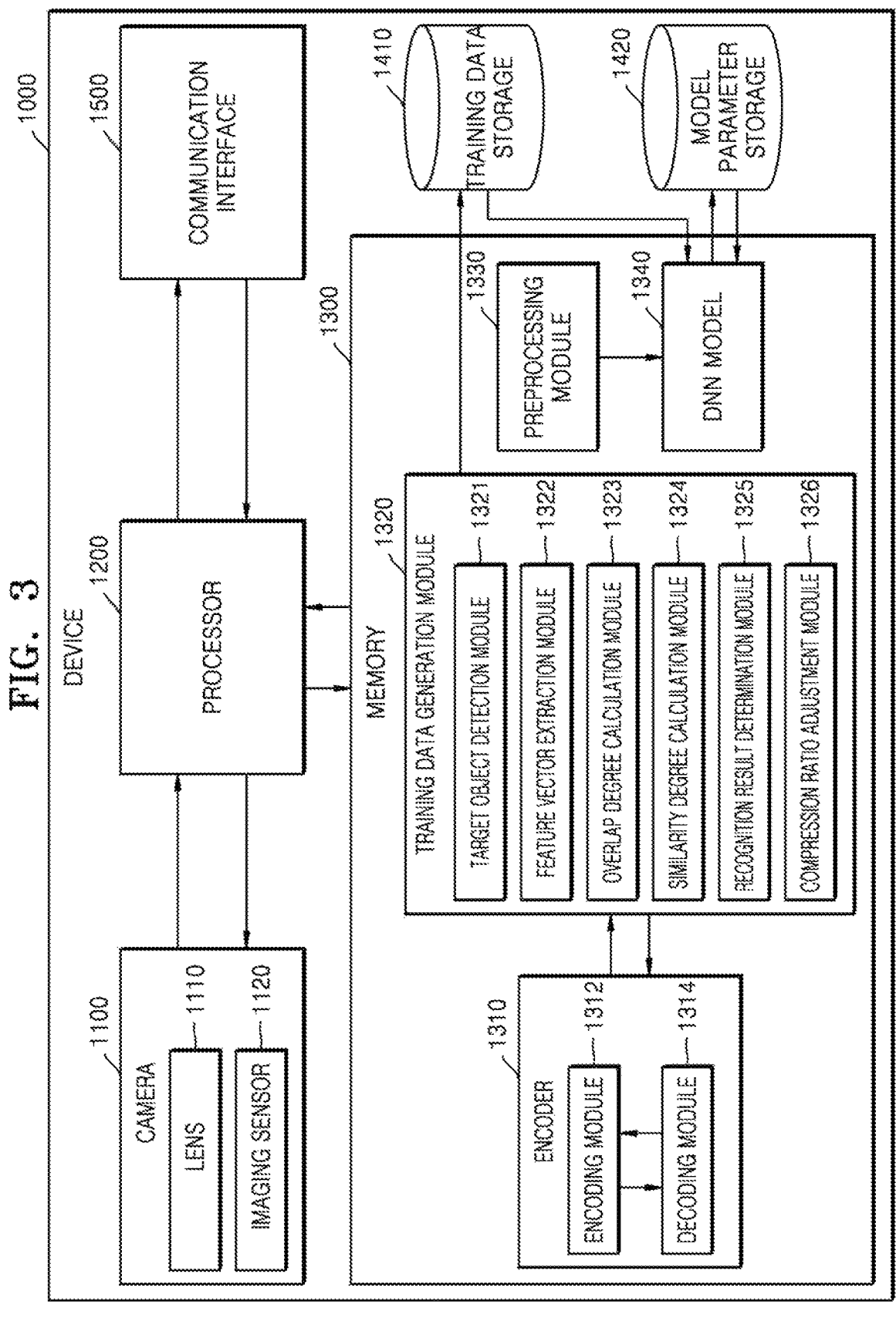
FIG. 3 is a block diagram of a configuration of a device according to an embodiment of the present disclosure.

In an embodiment, the generated bitstream may be transmitted to the external server 2000 or another device via a communication interface (1500 of FIG. 3).

Due to constraints on storage capacity or network bandwidths, general devices may compress an image or a video captured with a camera by using a compression method complying with standards (e.g., JPEG, H.264/AVC, HEVC (H.265), etc.) and encode the compressed image or video before transmission to a server 2000. In this case, when encoding is performed at an excessively high compression ratio, the quality of an image degrades so that a face, a hairstyle, clothing, etc. of a person to be recognized may not be identified in the image. Furthermore, in exceptional situations, such as a limited network bandwidth, data packet loss due to network instability, an error in an encoding operation, data packet loss in a user datagram protocol (UDP) environment, etc., a decoded image frame degrades, and a person's face and the like cannot be recognized in the degraded image frame. When the person's face cannot be recognized in the degraded image frame, the person is mistakenly recognized as another person, and thus, it is difficult to track an unauthorized person. In order to accurately recognize a target object including a person's face, hairstyle, clothing, etc. without an error, an optimal compression ratio for compressing an image or video needs to be determined. However, in order to determine the optimal compression ratio, it is necessary to determine whether the target object is recognized in a reconstructed image or video obtained after compressing an image or video with different compression ratio values, encoding the compressed image or video, and decoding the encoded image or video, or measure what the error rate is, which results in a long processing time and low efficiency due to the large number of computations.

The device according to the embodiment shown in FIG. 1 may train the DNN model 1340 and/or predict an optimal compression ratio using the trained DNN model 1340 in order to solve the above-described problems, i.e., to increase a recognition rate of a specific target object (e.g., a face, a hairstyle, clothing, a posture, etc.) even in exceptional situations, such as limited network bandwidth, network instability, an error in an encoding operation, data packet loss in a UDP environment, etc. The device according to an embodiment of the present disclosure may train the DNN model 1340 by using the plurality of raw images $i_{o-1}$ to $i_{o-n}$ and information about the compression ratios $QP_1$ to $QP_n$ for correctly recognizing target objects respectively in the plurality of raw images $i_{o-1}$ to $i_{o-n}$, and output a compression ratio value optimized for recognizing the target object in the input image i by using the trained DNN model 1340. Because the present disclosure uses the DNN model 1340 trained during the training operation (S100), unnecessary processing time may be reduced, and the amount of computation performed by a processor of the device may be reduced.

In addition, the device of the present disclosure may significantly improve the recognition rate of a target object, for example, a person's face, and reduce a false recognition rate.

FIG. 2 is a diagram illustrating a method, performed by a device, of determining a compression ratio from a raw image and storing the raw image and information about the determined compression ratio, according to an embodiment of the present disclosure.

Referring to FIG. 2, a raw image $i_o$ may be input to the target object detection module 1321 and the encoding module 1312. The raw image $i_o$ may be obtained via a camera or a network.

The raw image $i_o$ may be input to the target object detection module 1321, and the target object detection module 1321 may detect a target object in the raw image $i_o$. In an embodiment, the target object may include at least one of a person's face, hairstyle, clothing, and posture, but is not limited thereto.

The target object detection module 1321 is configured to detect the target object in the raw image $i_o$. In an embodiment, the target object detection module 1321 may be configured to detect the target object in the raw image $i_o$ by using an AI model including deep learning. In an embodiment, the target object detection module 1321 may detect the target object in the raw image $i_o$ by using a CNN model. For example, when the target object is a face, the target object detection module 1321 may detect a person's face in a video by using a large scale dataset, such as CASIA-WebFace, VGGFace/VGGFace2, or MS-Celeb-1M. In an embodiment, the target object detection module 1321 may include a MobileNet trained to perform face recognition using the VGGFace2 dataset.

The target object detection module 1321 may output at least one feature map $i_{f1}$ and $i_{f2}$ in the process of detecting the target object in the raw image $i_o$. The 'feature maps $i_{f1}$ and $i_{f2}$' are each an image including a feature vector extracted to detect the target object in the raw image $i_o$, and may include, for example, at least one of an edge map, a blur image, and a circular map.

The target object detection module 1321 may detect a first ROI $R_1$ including the target object detected in the raw image $i_o$. The first ROI $R_1$ may be an image of the target object, e.g., a bounding box including a person's face.

The target object detection module 1321 may provide an image of the detected first ROI $R_1$ and the detected at least one feature map $i_{f1}$ and $i_{f2}$ to the training data storage 1410. The training data storage 1410 may store, as training data, the image of the first ROI $R_1$ and the at least one feature map $i_{f1}$ and $i_{f2}$.

The target object detected in the raw image $i_o$ may be input to the feature vector extraction module 1322, and the feature vector extraction module 1322 may extract a first feature vector $f_1$ from the image of the target object. The first feature vector $f_1$ may be a vector including feature values corresponding to landmarks, such as the eyes, the nose, and the mouth of a person's face. However, the first feature vector $f_1$ is not limited thereto, and may be a vector including feature values corresponding to at least one key-point extracted from a person's hairstyle, clothing, or a specific posture.

The image of the first ROI $R_1$ detected in the raw image $i_o$ may be input to the overlap degree calculation module 1323, and the first feature vector $f_1$ extracted from the target object may be input to the similarity degree calculation module 1324.

When the raw image $i_o$ is input to the encoding module 1312, the encoding module 1312 may compress and encode the raw image $i_o$ using a preset compression ratio $QP_0$ to output encoded image data. In an embodiment, the encoded image data may be quantized transform coefficients.

The encoded image data is input to the decoding module 1314, and the decoding module 1314 may reconstruct residual data by performing inverse quantization and inverse transform on the encoded image data and obtain a reconstructed image $i_{recon}$ by adding prediction data obtained via inter-prediction and intra-prediction to the reconstructed residual data.

The reconstructed image $i_{recon}$ is input to the target object detection module 1321, and the target object detection module 1321 may detect a target object in the reconstructed image $i_{recon}$. The target object detected in the reconstructed image $i_{recon}$ may be the same as the target object detected in the raw image $i_o$, but image quality, such as the resolution and sharpness of an image of the target object, may be lower than that of an image of the target object detected in the raw image $i_o$. The target object detection module 1321 may detect a second ROI $R_2$ including the target object detected in the reconstructed image $i_{recon}$. The second ROI $R_2$ may be an image of the target object, e.g., a bounding box including a person's face.

The target object detected in the reconstructed image $i_{recon}$ is input to the feature vector extraction module 1322, and the feature vector extraction module 1322 may extract a second feature vector $f_2$ from the image of the target object detected in the reconstructed image $i_{recon}$. Because the second feature vector $f_2$ is the same as the first feature vector $f_2$ except that it is extracted from the image of the target object detected in the reconstructed image $i_{recon}$, descriptions already provided above are omitted.

The image of the second ROI $R_2$ detected in the reconstructed image $i_{recon}$ may be input to the overlap degree calculation module 1323, and the second feature vector $f_2$ extracted from the target object may be input to the similarity degree calculation module 1324.

The overlap degree calculation module 1323 may calculate a degree of overlap between the first ROI $R_1$ and the second ROI $R_2$, based on coordinate value information of the bounding box of the first ROI $R_1$ and coordinate value information of the bounding box of the second ROI $R_2$. In an embodiment, the overlap degree calculation module 1323 may calculate the degree of overlap between the first ROI $R_1$ and the second ROI $R_2$ by using an Intersection Over Union (IoU) method. The overlap degree calculation module 1323 may provide information about the calculated degree of overlap to the recognition result determination module 1325.

The similarity degree calculation module 1324 may calculate a degree of similarity between the first feature vector $f_1$ and the second feature vector $f_2$. In an embodiment, the similarity degree calculation module 1324 may calculate the degree of similarity representing a correlation between the first feature vector $f_1$ and the second feature vector $f_2$ as a numerical value, and provide information about the calculated degree of similarity to the recognition result determination module 1325.

The recognition result determination module 1325 is configured to determine whether the target object is correctly recognized by using the degree of overlap $(R_1, R_2)$ input from the overlap degree calculation module 1323 and the degree of similarity $(f_1, f_2)$ input from the similarity degree calculation module 1324. In an embodiment, the recognition result determination module 1325 may determine whether the target object is correctly recognized in the reconstructed image $i_{recon}$ by comparing a value of the degree of overlap $(R_1, R_2)$ with a first threshold and comparing a value of the degree of similarity $(f_1, f_2)$ with a second threshold.

For example, when the value of the degree of overlap $(R_1, R_2)$ is less than or equal to the first threshold or the value of the degree of similarity $(f_1, f_2)$ are less than or equal to the second threshold, the recognition result determination module 1325 determines that the target object is not correctly recognized in the reconstructed image $i_{recon}$. In this case, the recognition result determination module 1325 provides a result of determining whether the target object is recognized to the compression ratio adjustment module 1326.

When a result of determination that the target object is not correctly recognized is input from the recognition result determination module 1325, the compression ratio adjustment module 2340 may adjust a compression ratio to a first compression ratio $QP_1$ that is lower than the value of the preset compression ratio $QP_0$ used to obtain the reconstructed image $i_{recon}$. The compression ratio adjustment module 1326 may provide the encoding module 1312 with information about a value of the first compression ratio $QP_1$ that is an adjusted compression ratio.

The encoding module 1312 may obtain encoded image data by compressing the raw image $i_o$ using the value of the first compression ratio $QP_1$ input from the compression ratio adjustment module 2340 and encoding the compressed raw image. Operations performed by the decoding module 1314, the target object detection module 1321, the feature vector extraction module 1322, the overlap degree calculation module 1323, the similarity degree calculation module 1324, the recognition result determination module 1325, and the compression ratio adjustment module 2340 may be repeatedly performed as the image data obtained by compressing the raw image $i_o$ with the first compression ratio $QP_1$ and encoding the compressed raw image is input.

In another example, when the value of the degree of overlap $(R_1, R_2)$ exceeds the first threshold and the value of the degree of similarity $(f_1, f_2)$ exceeds the second threshold, the recognition result determination module 1325 may determine that the target object is correctly recognized in the reconstructed image $i_{recon}$. In this case, the recognition result determination module 1325 may determine a value of compression ratio $QP_k$ as an optimal compression ratio value for correctly recognizing the target object. The recognition result determination module 1325 may provide information about the determined value of compression ratio $QP_k$ to the training data storage 1410, and the training data storage 1410 may store the value of the compression ratio $QP_k$.

By performing the method shown in FIG. 2 on a plurality of raw images previously obtained, the device may obtain the plurality of raw images, a plurality of feature maps extracted from the plurality of raw images, and values of optimal compression ratios for correctly recognizing target objects respectively in the plurality of raw images, and store, in the training data storage 1410, the plurality of raw images, the plurality of feature maps, and the values of optimal compression ratios.

The device may perform training in which the plurality of raw images and the plurality of feature maps stored in the training data storage 1410 are applied as an input to the DNN model (1340 of FIG. 1) and labels related to a plurality of compression ratios are applied as ground-truth.

FIG. 3 is a block diagram illustrating components of a device 1000 according to an embodiment of the present disclosure. The device 1000 may perform either one or both of operation S100 and operation S200. When operation S100 and S200 are performed by separate devices, the target object detection module 131 used in the training operation S100 may be the same as or different from the target object detection module 131 used in the inference operation S200. If the target object detection module 131 used in the inference operation S200 utilizes a different object detection algorithm and/or produces a different object detection performance from the target object detection module 131 used in the training operation S100, the model parameters of the trained DNN model 1340 may be further updated for fine-tuning of the model parameters.

The device 300 may be an electronic device that processes an image obtained via a camera 1100 or the communication interface 1500 and performs various calculations. For example, the device 1000 may be at least one of a smartphone, a tablet personal computer (PC), a mobile phone, a video phone, an e-book reader, a desktop PC, a laptop PC, a netbook computer, a workstation, a personal digital assistant (PDA), a portable multimedia player (PMP), an MP3 player, a mobile medical device, a wearable device, and an Internet Protocol (IP) camera.

Referring to FIG. 3, the device 1000 may include the camera 1100, a processor 1200, a memory 1300, a training data storage 1410, a model parameter storage 1420, and the communication interface 1500.

The camera 1100 is configured to obtain an image by capturing a target area or a target object via a lens 1110. The camera 1100 may include the lens 1110 and an imaging sensor 1120.

The imaging sensor 1120 may obtain an image of the target area or target object captured using the lens 1110. The image obtained via the imaging sensor 314 is a raw image corresponding to uncompressed image data. The imaging sensor 1120 may include a photodiode array. The imaging sensor 1120 may include, for example, a charge-coupled device (CCD) module or a complementary metal-oxide-semiconductor (CMOS) module, but is not limited thereto. Although one imaging sensor 1120 is shown in FIG. 3, the present disclosure is not limited thereto. In an embodiment, the imaging sensor 1120 may be configured as a plurality of imaging sensors.

The processor 1200 may execute one or more instructions or code of a program stored in the memory 1300. The processor 1200 may be composed of hardware components for performing arithmetic, logic and input/output (I/O) operations and signal processing. For example, the processor 1200 may consist of at least one of a CPU, a microprocessor, a graphics processing unit (GPU), an AP, application specific integrated circuits (ASICs), digital signal processors (DSPs), digital signal processing devices (DSPDs), programmable logic devices (PLDs), and field programmable gate arrays (FPGAs), but is not limited thereto.

The memory 1300 may include, for example, at least one of a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EE-PROM), PROM, magnetic memory, magnetic disks, and optical disks.

The memory 1300 may store a program including instructions related to execution of functions or operations of determining a compression ratio for correctly recognizing a target object in each of a plurality of previously obtained raw images, outputting a compression ratio by using an image obtained via the camera 1100 or the communication interface 1500 as an input to the DNN model 1340, and compressing and encoding an image by using the output compression ratio. The memory 1300 may store at least one of instructions, algorithms, data structures, and program code that are readable by the processor 1200. The instructions, algorithms, data structures, and program code stored in the memory 1300 may be implemented by a programming or scripting language, such as C, C++, Java, assembler, etc.

The memory 1300 may include an encoder 1310, a training data generation module 1320, a preprocessing module 1330, and a DNN model 1340. A plurality of 'modules' included in the memory 1300 indicate a unit for processing a function or operation performed by the processor 1200, and may be implemented using software, such as instructions or program code.

In embodiments set forth below, the processor 1200 may be implemented by executing instructions or code of a program stored in the memory 1300.

The encoder 1310 is configured to generate a reconstructed image by compressing, encoding, and decoding an image. In an embodiment, the encoder 1310 may generate a reconstructed image by compressing, encoding, and decoding a raw image using at least one of image compression standards including JPEG, H.264/AVC, and HEVC (H.265).

The encoder 1310 may include an encoding module 1312 and a decoding module 1314. The encoding module 1312 may be configured to encode an input image, i.e., a raw image, using a preset compression ratio and obtain encoded image data from the raw image. In an embodiment, by executing instructions or program code related to the encoding module 1312, the processor 1200 may obtain prediction data from an input image, i.e., a raw image, via inter-prediction and intra-prediction, obtain residual data produced by subtracting the prediction data from the raw image, and obtain encoded image data by performing transformation and quantization on the residual data. For example, the encoded image data may be quantized transform coefficients.

The decoding module 1314 may be configured to generate a reconstructed image by decoding the encoded image data. In an embodiment, by executing instructions or program code related to the decoding module 1314, the processor 1200 may reconstruct the residual data by performing inverse quantization and inverse transform on the encoded image data, i.e., the quantized transform coefficients, and obtain a reconstructed image by adding the prediction data obtained via inter-prediction and intra-prediction to the reconstructed residual data.

When using an image compression standard, such as H.264/ACV or HEVC (H.265), the encoder 1310 may include, for example, an inter-prediction module, an intra-prediction module, a deblocking module, a transform module, a quantization module, an inverse transform module, an inverse quantization module, and an entropy encoding module. In this case, the modules listed above perform inter-prediction and intra-prediction and encoding and decoding, and thus, are not completely divided into the encoding module 1312 and the decoding module 1314, as shown in FIG. 3.

When a reconstructed image is generated using H.264/AVC or HEVC (H.265), the reconstructed image may be obtained by compressing and encoding a raw image by applying different quantization parameter values according to a coding tree unit (CTU) and decoding the encoded image. In this case, a specific CTU in which a target object (e.g., a person's face, hairstyle, clothing, posture, etc.) is detected among a plurality of CTUs in an image frame included in the raw image may be compressed by applying a lower quantization parameter value thereto than to other CTUs.

The training data generation module 1320 may receive a raw image and output training data based on the raw image. Here, the 'training data' refers to data applied as an input and an output in order to perform training of the DNN model 1340. In an embodiment, the training data may include a plurality of raw images previously obtained, a plurality of feature maps extracted from the plurality of raw images, and optimal compression ratios for correctly recognizing target objects respectively in the plurality of raw images.

The training data generation module 1320 may include a target object detection module 1321, a feature vector extraction module 1322, an overlap degree calculation module 1323, a similarity degree calculation module 1324, a recognition result determination module 1325, and a compression ratio adjustment module 1326.

The target object detection module 1321 may recognize a target object in a still image or video. Here, a target object refers to an object of interest that the user desires to detect in an image. The target object may include, for example, at least one of a person's face, hairstyle, clothing, and posture. In an embodiment, the target object detection module 1321 may be configured to detect a target object in an input image by using an AI model including deep learning. In an embodiment, the target object detection module 1321 may detect a target object in an image by using a CNN model. For example, when the target object is a face, the target object detection module 1321 may detect a person's face in a video by using a large scale dataset, such as CASIA-WebFace, VGGFace/VGGFace2, or MS-Celeb-1M. In an embodiment, the target object detection module 1321 may include a MobileNet trained to perform face recognition using the VGGFace2 dataset.

In an embodiment, by executing instructions or program code related to the target object detection module 1321, the processor 1200 may detect a target object in each of a raw image and a reconstructed image. For example, the processor 1200 may detect a person's face in each of the raw image and the reconstructed image by performing training using model parameters trained via a CNN model. However, the present disclosure is not limited thereto, and the processor 1200 may detect at least one of a person's hairstyle, clothing, and posture in each of the raw image and the reconstructed image by performing training using the trained model parameters included in the target object detection module 1321.

However, a method, performed by the target object detection module 1321, of detecting a target object is not limited to the above-described method. In an embodiment, the target object detection module 1321 may be configured to recognize a target object in a video by using an AI model including at least one of an RNN model, support vector machine (SVM), linear regression, logistic regression, Naive Bayes classification, random forest, decision tree, and a k-nearest neighbor algorithm.

In an embodiment, by executing instructions or program code related to the target object detection module 1321, the processor 1200 may detect a target object in an image. The target object detection module 1321 may output at least one feature map in the process of detecting the target object. A 'feature map' is an image including a feature vector extracted to detect the target object in the image, and may include, for example, at least one of an edge map, a blur image, and a circular map. In an embodiment, in the case of using a CNN model, the device may perform a convolution on a raw image by using a filter having a preset size and a preset number of channels, extract the same number of 2D image layers as the number of filters as a result of convolutions, and obtain the feature maps $i_{f1}$ and $i_{f2}$, each being composed of 2D image layers.

In an embodiment, the target object detection module 1321 may be configured to identify a bounding box of a target object detected in a video and obtain position coordinate values of the identified bounding box. By executing instructions or program code related to the target object detection module 1321, the processor 1200 may identify a bounding box of a target object detected in a raw image and set a region included in the bounding box to be a first ROI. By executing instructions or program code related to the target object detection module 1321, the processor 1200 may identify a bounding box of a target object detected in a reconstructed image and set a region included in the bounding box to be a second ROI.

The feature vector extraction module 1322 may extract a feature vector from an image of a detected target object. The feature vector extraction module 1322 may be configured to extract a feature vector from an image of a target object by using a known image processing method or an AI model including deep learning. For example, the feature vector extraction module 1322 may be configured to extract a feature vector from an image of a target object by using an independent component analysis (ICA) or principle component analysis (PCA) method.

For example, when an image of a target object shows a person's face, the feature vector extraction module 1322 may identify landmarks including the eyes, the nose, and the mouth (both mouth corners) of the face, obtain feature values (e.g., position coordinate values) corresponding to the identified landmarks, and extract a feature vector by using the obtained feature values. In another example, when an image of a target object shows a person's hairstyle, clothing, or specific posture, the feature vector extraction module 1322 may identify at least one key-point in the image of the target object, obtain feature values (e.g., position coordinate values) corresponding to the identified at least one key-point, and extract a feature vector by using the obtained feature values.

In an embodiment, by executing instructions or program code related to the feature vector extraction module 1322, the processor 1200 may extract a feature vector from an image of a target object. In an embodiment, the processor 1200 may extract a first feature vector from an image of a target object recognized in a raw image and extract a second feature vector from an image of a target object recognized in a reconstructed image.

The overlap degree calculation module 1323 may calculate a degree of overlap among two or more images and output a resulting value. The overlap degree calculation module 1323 may be configured to obtain information about coordinate values of bounding boxes on the two or more images and calculate the degree of overlap by comparing the degree of overlap among the two or more images using the obtained coordinate values of the bounding boxes.

In an embodiment, the overlap degree calculation module 1323 may calculate the degree of overlap among two or more images by using an IoU method for calculating the degree of overlap using coordinate value information. In the calculation of the degree of overlap using the IoU method, an IoU value of 1 means that two images perfectly overlap, and an IoU value of 0 means that the two images do not overlap at all. For example, when the IoU value is 0.5, it means that two-thirds of the two images overlap.

In an embodiment, the overlap degree calculation module 1323 may calculate the degree of overlap by calculating the sum of squares of errors between coordinate values of a plurality of images. For example, the overlap degree calculation module 1323 may calculate a coordinate value error by using coordinate values $(x_{11}, y_{11})$ of an upper-left corner of a first image, coordinate values $(x_{12}, y_{12})$ of a lower-right corner of the first image, coordinate values $(x_{21}, y_{21})$ of an upper-left corner of a second image, and coordinate values $(x_{22}, y_{22})$ of a lower-right corner of the second image, as shown in Equation 1 below.

$$\text{coordinate value} \qquad\qquad\qquad\qquad [\text{Equation 1}]$$
$$\text{error} = (x_{11} - x_{21})^2 + (x_{12} - x_{22})^2 + (y_{11} - y_{21})^2 + (y_{12} - y_{22})^2$$

However, the IoU method and the coordinate value error calculation method are examples of an overlap degree calculation method, and a method, performed by the overlap degree calculation module 1323, of calculating the degree of overlap among two or more images is not limited to the IoU method and the coordinate value error calculation method.

By executing instructions or program code related to the overlap degree calculation module 1323, the processor 1200 may calculate a degree of overlap between the first ROI including the target object recognized in the raw image and the second ROI including the target object recognized in the reconstructed image, based on coordinate value information of a bounding box of the first ROI and coordinate value information of a bounding box of the second ROI. In an embodiment, the processor 1200 may calculate the degree of overlap between the first ROI and the second ROI by using the IoU method or the coordinate value error calculation method provided by the overlap degree calculation module 1323. In an embodiment, the processor 1200 may calculate a coordinate value error between the first and second ROIs by using coordinate values of an upper-left corner and a lower-right corner of a bounding box of the first ROI and coordinate values of an upper-left corner and a lower-right corner of a bounding box of the second ROI, and calculate the degree of overlap between the first and second ROIs based on the calculated coordinate value error.

The similarity degree calculation module 1324 may calculate a degree of similarity between two feature vectors as a numerical value. In an embodiment, the similarity degree calculation module 1324 may be configured to calculate a correlation between two feature vectors as a numerical value.

By executing instructions or program code related to the similarity degree calculation module 1324, the processor 1200 may calculate, as a numerical value, a degree of similarity between the first feature vector extracted from the target object detected in the raw image and the second feature vector extracted from the target object detected in the reconstructed image. The processor 1200 may calculate the degree of similarity between the first feature vector and the second feature vector, for example, by using Equation 2 below.

$$SIM = \frac{1}{N-1}\sum_{i=1}^{N}\left(\frac{F_{enc}[n] - \mu_{F_{enc}}}{\sigma_{F_{enc}}}\right)\left(\frac{F_{orig}[n] - \mu_{F_{orig}}}{\sigma_{F_{orig}}}\right) \quad \text{[Equation 2]}$$

In Equation 2 above, $F_{orig}$ and $F_{enc}$ respectively denote a first feature vector extracted from a target object detected in a raw image and a second feature vector extracted from a target object detected in a reconstructed image, N is a length of the feature vectors, $\mu$ is a mean value of the feature vectors, and $\sigma$ is a standard deviation of the feature vectors.

Equation 2 above is an example for calculating the degree of similarity, and a method, performed by the processor 1200, of calculating the degree of similarity between the first and second feature vectors by using the similarity degree calculation module 1324 is not limited to Equation 2.

The recognition result determination module 1325 may determine whether the target object is correctly recognized in the reconstructed image, based on the degree of overlap between the ROIs detected respectively in the raw image and the reconstructed image and the degree of similarity between the feature vectors respectively extracted from the raw image and the reconstructed image. The recognition result determination module 1325 may compare the degree of overlap between the first and second ROIs, which is calculated using the overlap degree calculation module 1323, with a preset first threshold, and compare the degree of similarity between the first and second feature vectors, which is calculated using the similarity degree calculation module 1324, with a preset second threshold. For example, the first threshold may be 0.8, and the second threshold may be 0.5. However, numerical values of the first threshold and the second threshold are not limited to those described above.

By executing instructions or program code related to the recognition result determination module 1325, the processor 1200 may compare the degree of overlap between the first and second ROIs with the first threshold and compare the degree of similarity between the first and second feature vectors with the preset second threshold. The recognition result determination module 1325 may provide information about comparison results to the compression ratio adjustment module 1326.

The compression ratio adjustment module 1326 may determine a compression ratio at which the raw image is compressed to obtain the reconstructed image, based on whether the target object is recognized, which is determined by the recognition result determination module 1325. Here, a 'compression ratio' represents an image compression parameter for encoding a raw image by using a method that matches a standard specification. Compression ratios may exist in various forms for each standard specification. For example, in standards for playing still images (e.g., JPEG, JPEG-2000, JPEG-XR, WebP, etc.), a quantization table may be used to determine a compression ratio of an image. As another example, in standards for playing a video (e.g., H.264/AVC, HEVC (H.265), etc.), a compression ratio of an image may be determined using a quantization parameter. In an embodiment, the compression ratio adjustment module 1326 may be configured to determine a value of a quantization parameter based on results of respectively comparing the degree of overlap and the degree of similarity obtained from the recognition result determination module 1325 with preset thresholds.

A 'quantization parameter' is a parameter indicating a degree of quantization of transform coefficients defined in a standard related to compression of a video, e.g., H.264/AVC or HEVC (H.265), and may be used to determine a compression ratio of an image. In an embodiment, a compression ratio is proportional to a value of a quantization parameter. For example, when the value of the quantization parameter is large, the compression ratio is high, and when the value of the quantization parameter is small, the compression ratio is low.

The compression ratio adjustment module 1326 may be configured to adjust a value of compression ratio based on the comparison results provided by the recognition result determination module 1325. In an embodiment, by executing instructions or program code related to the compression ratio adjustment module 1326, the processor 1200 may adjust a value of a quantization parameter, based on a result of comparing the degree of overlap between the first and second ROIs with the first threshold and a result of comparing the degree of similarity between the first and second feature vectors with the second threshold. The compression ratio adjustment module 1326 may change the value of the compression ratio by a preset unit.

In an embodiment, the processor 1200 may change the value of the compression ratio when the degree of overlap is less than or equal to the first threshold or the degree of similarity is less than or equal to the second threshold as a result of the comparison using the recognition result determination module 1325. In this case, the processor 1200 may change the value of the compression ratio to a value lower than the compression ratio used to compress and encode the previously reconstructed image. In an embodiment, when the degree of overlap exceeds the first threshold and the degree of similarity exceeds the second threshold as a result of the comparison using the recognition result determination module 1325, the processor 1200 may determine the compression ratio used to generate the reconstructed image as a final compression ratio.

In an embodiment, the processor 1200 may repeatedly perform operations for determining a compression ratio when the degree of overlap is less than or equal to the first threshold or the degree of similarity is less than or equal to the second threshold. For example, the processor 1200 may repeat at least once operations of compressing a raw image using a compression ratio changed via the compression ratio adjustment module 1326, generating a reconstructed image through encoding and decoding, recognizing a target object in the reconstructed image and extracting a second feature vector from the target object, calculating the degree of overlap, calculating the degree of similarity, determining whether the target object is correctly recognized, and readjusting the compression ratio.

In an embodiment, when the degree of overlap exceeds the first threshold and the degree of similarity exceeds the second threshold, the processor 1200 may determine a final compression ratio and store information about the determined final compression ratio in the training data storage 1410. The processor 1200 may store, together with the information about the determined final compression ratio, the raw image and at least one feature map extracted from the raw image in the training data storage 1410. In an embodiment, by performing the above-described training data generation operation on a plurality of raw images previously obtained, the processor 1200 may store, in the training data storage 1410, the plurality of raw images, a plurality of feature maps, and information about a plurality of compression ratios.

The preprocessing module 1330 may perform preprocessing on an input image. The preprocessing module 1330 may resize the image to a preset size and normalize brightness and contrast of the image. By inputting an image obtained through capturing with the camera 1100 or obtained via the communication interface 1500 to the preprocessing module 1330, the processor 1200 may resize the image and normalize brightness and contrast of the image. The processor 1200 may input the image preprocessed by the preprocessing module 1330 to the DNN model 1340.

The DNN model 1340 is an AI model configured to perform machine learning by using training data prestored in the training data storage 1410. In an embodiment, the processor 1200 may perform supervised learning where a plurality of raw images and a plurality of feature maps prestored in the training data storage 1410 are applied as an input to the DNN model 1340 and labels related to optimal compression ratio values for correctly recognizing target objects respectively in the plurality of raw images are applied as ground-truth.

In an embodiment, the DNN model 1340 may include a plurality of hidden layers that are interior layers that perform calculations. The DNN model 1340 may include, for example, at least one of a CNN, an RNN, an RBM, a DBN, a BRDNN, and DQN. However, the DNN model 1340 is not limited to the above-described example, and may include all known deep learning-based neural network models.

For example, when the DNN model 1340 is implemented as a CNN model, in the training operation, the processor 1200 may extract feature values by striding over a plurality of raw images input from the training data storage 1410 by using a filter having a preset size and a preset number of channels, obtain a plurality of layers including the extracted feature values, and obtain a feature vector map by applying weights to the plurality of layers. A ReLU model may be used in the process of obtaining the feature vector map, and in order to improve the efficiency, operations of regularizing a learning model through dropout and performing pooling or max pooling may be further added. Subsequently, feature values obtained through the pooling or max pooling are integrated via a fully connected layer, and the DNN model 1340 may be trained to output labels related to compression ratio values via activation functions including softmax, sigmoid, and hyperbolic tangent.

The processor 1200 may obtain model parameters via training of the DNN model 1340. In an embodiment, when the DNN model 1340 is implemented as a CNN model, the processor 1200 may obtain model parameters including weights and biases between a plurality of layers via supervised learning using the DNN model 1340. Here, a 'weight' and a 'bias' are parameters for inferring output labels (compression ratio values) from input data (a plurality of raw images and a plurality of feature maps), and values thereof may be adjusted as training is performed. The processor 1200 may store, in the model parameter storage 1420, information about weights and biases obtained via training of the DNN model 1340.

In an embodiment, by inputting an image preprocessed by the preprocessing module 1330 to the DNN model 1340 composed of trained model parameters, the processor 1200 may output a compression ratio for correctly recognizing a target object in the image. In an embodiment, the processor 1200 may input, to the DNN model 1340, at least one feature map extracted in the process of detecting a target object in an image. By inputting at least one feature map to the DNN model 1340, accuracy of the output compression ratio may be further improved. The 'accuracy of an output compression ratio' refers to the degree to which a target object is accurately recognized in an image input to the DNN model 1340, and the accuracy of the compression ratio is proportional to a recognition rate of the target object.

The DNN model 1340 may be implemented as a software module including at least one instruction or program code. In this case, the DNN model 1340 may be stored in non-transitory computer-readable media. Also, the DNN model 1340 may be provided by an operating system of the device 1000 or via a certain application.

Although the DNN model 1340 is illustrated in FIG. 3 as a software module stored in the memory 1300 and has been described to be executed by the processor 1200, the present disclosure is not limited thereto. In an embodiment, the DNN model 1340 may be manufactured in the form of at least one hardware chip and loaded into the device 1000. For example, the DNN model 1340 may be manufactured in the form of a dedicated hardware chip for an AI model, or may be manufactured as a part of an existing general-purpose processor (e.g., a CPU or an AP) or a dedicated graphics processor (e.g., a GPU) and included in the device 1000.

Furthermore, the DNN model 1340 may be loaded into a separate device other than the device 1000. For example, the DNN model 1340 may be included in the external server (2000 of FIG. 1). In this case, the device 1000 may transmit, to the server 2000, an image preprocessed by the preprocessing module 1330, and receive, from the server 2000, information about a compression ratio for correctly recognizing a target object in the image.

The processor 1200 may provide information about the compression ratio output from the DNN model 1340 to the encoder 1310. The encoder 1310 may generate a bitstream by compressing an image using the compression ratio input from the DNN model 1340 and encoding the compressed image. The processor 1200 may transmit the bitstream to the external server 2000 or another device using the communication interface 1500.

In an embodiment, the processor 1200 may compare the information about the compression ratio obtained from the output of the DNN model 1340 with a value of compression ratio determined based on bandwidth information of a network connected via the communication interface 1500 and an initial compression ratio preset by the encoding module 1312, and determine a value of a final compression ratio based on a comparison result. This will be described in detail with reference to FIG. 10.

The training data storage 1410 is a database for storing training data generated by the training data generation module 1320. In an embodiment, the training data storage 1410 may be configured as non-volatile memory. Non-volatile memory refers to a storage medium in which information is stored and retained even when power is not supplied and the stored information is able to be used again when power is supplied. For example, the training data storage 1410 may include at least one of a flash memory, a hard disk, solid state drive (SSD), a multimedia card micro-type memory, a card-type memory (e.g., an SD card or an XD memory), ROM, a magnetic memory, a magnetic disk, and an optical disk.

Although FIG. 3 shows the training data storage 1410 is a separate component other than the components of the memory 1300 of the device 1000, the present disclosure is not limited thereto. In an embodiment, the training data storage 1410 may also be included in the memory 1300. Alternatively, the training data storage 1410 is a component not included in the device 1000 and may be connected via the communication interface 1500 by using a wired or wireless communication method.

The training data storage 1410 may include a plurality of raw images and a plurality of feature maps and information about a plurality of compression ratio values output by the training data generation module 1320. In an embodiment, the training data storage 1410 may store, as a key-value type, the plurality of raw images, the plurality of feature maps, and the plurality of compression ratio values.

The model parameter storage 1420 is a database for storing model parameters obtained by training the DNN model 1340. Model parameters may vary depending on a type of the DNN model 1340. For example, when the DNN model 1340 is a CNN model, the model parameter storage 1420 may store model parameters including weights and biases between a plurality of layers.

The model parameter storage 1420 may be configured as non-volatile memory. For example, the model parameter storage 1420 may include at least one of a flash memory, a hard disk, SSD, a multimedia card micro-type memory, a card-type memory (e.g., an SD card or an XD memory), ROM, a magnetic memory, a magnetic disk, and an optical disk.

Although FIG. 3 shows the model parameter storage 1420 is a separate component other than the components of the memory 1300 of the device 1000, the present disclosure is not limited thereto. In an embodiment, the model parameter storage 1420 may also be included in the memory 1300. Alternatively, the model parameter storage 1420 is a component not included in the device 1000 and may be connected via the communication interface 1500 by using a wired or wireless communication method.

The communication interface 1500 is configured to perform data transmission and reception between the device 1000 and a server or another device. The communication interface 1500 may perform data communication with the server or the other device by using at least one of wired and wireless data communication methods including Ethernet, wired and wireless local area networks (LANs), Wi-Fi, Wi-Fi Direct (WFD), and Wireless Gigabit Alliance (Wi-Gig).

Figure 4:
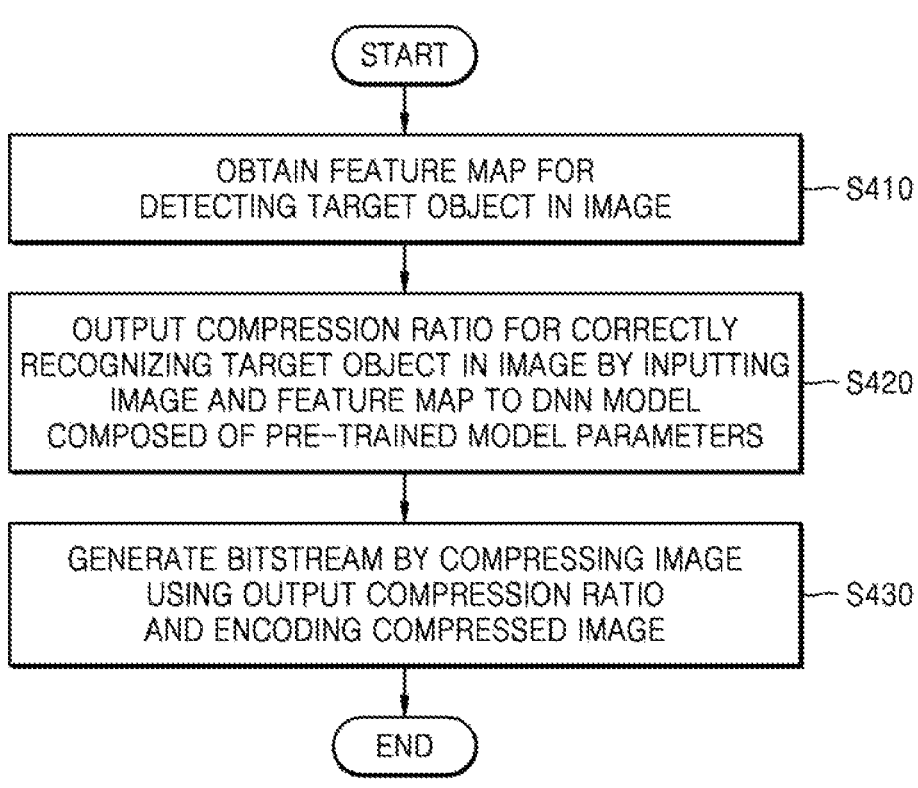
FIG. 4 is a flowchart of an operating method of a device, according to an embodiment of the present disclosure.

FIG. 4 is a flowchart of an operating method of the device 1000, according to an embodiment of the present disclosure.

In operation S410, the device 1000 obtains a feature map for detecting a target object in an image. The device 1000 may capture an object using a camera or obtain an image via a network. An 'image' refers to a still image or a video including at least one frame. The device 1000 may detect a target object in the still image or video and obtain a feature map in the process of detecting the target object. Here, a target object refers to an object of interest that a user desires to detect in an image. The target object may include, for example, at least one of a person's face, hair, clothing, and posture.

In an embodiment, the device 1000 may detect the target object in the image by using an AI model including deep learning. In an embodiment, the device 1000 may detect the target object in the image by using a CNN model. For example, when the target object is a face, the device 1000 may detect a person's face in a video by using a large scale dataset, such as CASIA-WebFace, VGGFace/VGGFace2, or MS-Celeb-1M. In an embodiment, the device 1000 may include a MobileNet trained to perform face recognition using the VGGFace2 dataset.

The device 1000 may output at least one feature map in the process of detecting the target object. A 'feature map' is an image including a feature vector extracted to detect the target object in the image, and may include, for example, at least one of an edge map, a blur image, and a circular map. In an embodiment, in the case of using a CNN model, the device 1000 may perform a convolution on a raw image by using a filter having a preset size and a preset number of channels, extract the same number of 2D image layers as the number of filters as a result of convolutions, and obtain at least one feature map composed of the 2D image layers.

Although not shown in FIG. 4, an operation of preprocessing an image may be performed before obtaining the feature map (operation S410). The device 1000 may resize the image to a preset size and normalize brightness and contrast of the image.

In operation S420, by inputting the image and the feature map to a DNN model composed of trained model parameters, the device 1000 outputs a compression ratio for correctly recognizing a target object in the image. In an embodiment, by performing training using, as an input, the image and the feature map extracted from the image, the device 1000 may output a compression ratio for correctly recognizing the target object in the image. A 'compression ratio for correctly recognizing a target object' means a compression ratio when an error rate of recognition of the target object is less than a preset error rate.

The DNN model is an AI model obtained by performing training using prestored training data. In an embodiment, the DNN model may include model parameters obtained via training performed before operations S410 and S420 are performed. Here, 'trained model parameters' may include weights and biases for a plurality of layers included in the DNN model. In an embodiment, the trained model parameters may be obtained by performing supervised learning where a plurality of raw images and a plurality of feature maps are applied as an input and labels related to a plurality of compression ratio values are applied as ground-truth. A specific embodiment in which a value of a compression ratio for correctly recognizing a target object is determined for each of a plurality of previously obtained raw images is described in detail with reference to FIGS. 5 to 7.

In an embodiment, the DNN model may include a plurality of hidden layers that are interior layers that perform calculations. The DNN model may include, for example, at least one of a CNN, an RNN, an RBM, a DBN, a BRDNN, and DQN. However, the DNN model is not limited to the above-described example, and may include all known deep learning-based neural network models.

For example, when the DNN model is implemented as a CNN model, the device 1000 may extract feature values by striding over a plurality of raw images applied as an input by using a filter having a preset size and a preset number of channels, obtain a plurality of layers including the extracted feature values, and obtain a feature vector map by applying weights to the plurality of layers. A ReLU model may be used in the process of obtaining the feature vector map, and in order to improve the efficiency, operations of regularizing a learning model through dropout and performing pooling or max pooling may be further added. Subsequently, feature values obtained through the pooling or max pooling are integrated via a fully connected layer, and the DNN model may be trained to output labels related to compression ratio values via activation functions including softmax, sigmoid, and hyperbolic tangent.

In operation S430, the device 1000 generates a bitstream by compressing the image using the output compression ratio and encoding the compressed image. In an embodiment, the device 1000 may split an image into a plurality of CTUs, compress and encode a CTU in which the target object is detected from among the plurality of CTUs by using the compression ratio output in operation S420, and compress and encode a CTU in which the target object is not detected by using an initially set compression ratio. This will be described in detail with reference to FIGS. 8 and 9.

In an embodiment, the device 1000 may compare a value of the compression ratio output in operation S420 with a value of a compression ratio determined based on a bandwidth of a network connected to the device 1000 and an initial compression ratio set by the encoding module (1312 of FIG. 3) to thereby determine a final compression ratio at which the image is to be compressed. This will be described in detail with reference to FIG. 10.

FIG. 5 is a flowchart of a method, performed by the device 1000, of determining a compression ratio for correctly recognizing a target object in a raw image, according to an embodiment of the present disclosure. Operation S500 shown in FIG. 5 is performed before operation S410 shown in FIG. 4 is performed.

In operation S510, the device 1000 generates a reconstructed image by compressing a previously obtained raw image at a preset compression ratio, encoding the compressed raw image, and decoding the encoded image. Here, a 'raw image' is uncompressed image data captured using a camera or obtained via a network. In an embodiment, the preset compression ratio for compressing the raw image may mean a compression ratio initially set by the encoding module (1312 of FIG. 3). In an embodiment, by using the encoder (1310 of FIG. 3), the device 1000 may generate a reconstructed image by compressing the raw image at the preset compression ratio, encoding the compressed raw image, and decoding the encoded image. The encoder 1310 may generate a reconstructed image by compressing, encoding, and decoding a raw image using at least one of video compression standards including, for example, H.264/AVC and HEVC (H.265). In another embodiment, the encoder 1310 may generate a reconstructed image by compressing, encoding, and decoding a raw image using at least one of still image compression standards including, for example, JPEG, JPEG-2000, JPEG-XR, WebP, etc.

In operation S520, the device 1000 detects a target object in the raw image and extracts a first feature vector from the detected target object. The 'target object' may include, for example, at least one of a person's face, hairstyle, clothing, and posture. In an embodiment, the device 1000 may recognize the target object in the raw image and extract the first feature vector from the recognized target object by using a known image processing technique or an AI model including deep learning.

In an embodiment, the processor (1200 of FIG. 3) of the device 1000 may detect the target object in the raw image by using a CNN model. The processor 1200 may detect the target object in the raw image by using model parameters-trained via the CNN model. For example, when the target object is a face, the processor 1200 may detect a person's face in the raw image by using a large scale dataset, such as CASIA-WebFace, VGGFace/VGGFace2, or MS-Celeb-1M.

In an embodiment, the processor 1200 may extract the first feature vector from an image of the target object by using a known image processing technique or an AI model including deep learning. For example, the processor 1200 may extract the first feature vector from the image of the target object by using an ICA or PCA method. The first feature vector may be a vector including feature values corresponding to landmarks, such as the eyes, the nose, and the mouth of a person's face. However, the first feature vector is not limited thereto, and may be a vector including feature values corresponding to at least one key-point extracted from a person's hairstyle, clothing, or a specific posture.

In an embodiment, the processor 1200 may extract the first feature vector from the image of the target object by using a CNN model. For example, the processor 1200 may extract feature values by striding over the image of the target object using a kernel having a preset size and a preset number of channels, obtain a plurality of layers including the extracted feature values, and obtain a feature vector map by applying weights to the plurality of layers. A ReLU model may be used in the process of obtaining a feature vector value, and in order to improve the efficiency, operations of regularizing feature values through dropout and performing pooling or max pooling may be further added. The processor 1200 may extract the first feature vector from the image of the target object detected in the raw image by using a CNN model, such as MobileNet v1/v2.

In operation S530, the device 1000 recognizes a target object in the reconstructed image and extracts a second feature vector from the detected target object. Because the target object is recognized and the second feature vector is extracted from the 'reconstructed image' instead of the raw image in operation S530, operation S530 is performed in the same manner as operation S52 except for only a difference in the image from which the target object is recognized and the second feature vector is extracted. Therefore, descriptions already provided above with respect to operation S520 are omitted.

In operation S540, the device 1000 determines whether the target object is correctly recognized in the raw image based on a degree of overlap between a first ROI including the target object detected in the raw image and a second ROI including the target object detected in the reconstructed image and a degree of similarity between the first and second feature vectors. In an embodiment, the processor 1200 may identify a bounding box of the target object detected in the raw image and set a region included in the identified bounding box to be a first ROI. Similarly, the processor 1200 may identify a bounding box of the target object detected in the reconstructed image and set a region included in the bounding box to be a second ROI.

The processor 1200 may calculate a degree of overlap between the first and second ROIs and a degree of similarity between the first and second feature vectors. In an embodiment, the processor 1200 may compare the calculated degree of overlap with a preset first threshold, compare the calculated degree of similarity with a preset second threshold, and determine whether the target object is correctly recognized in the reconstructed image based on comparison results.

Here, a 'compression ratio' represents an image compression parameter for encoding a raw image by using a method that matches a standard specification. Compression ratios may exist in various forms for each standard specification. For example, in standards for compressing still images (e.g., JPEG, JPEG-2000, JPEG-XR, WebP, etc.), a quantization table may be used to determine a compression ratio of an image. For example, in standards for playing a video (e.g., H.264/AVC, HEVC (H.265), etc.), a compression ratio of an image may be determined based on a quantization parameter.

A 'quantization parameter' is a parameter indicating a degree of quantization of transform coefficients defined in a standard related to compression of a video, e.g., H.264/AVC or HEVC (H.265), and may be used to determine a compression ratio of an image. In an embodiment, a compression ratio is proportional to a value of a quantization parameter. For example, when the value of the quantization parameter is large, the compression ratio is high, and when the value of the quantization parameter is small, the compression ratio is low.

In an embodiment, when the degree of overlap is less than or equal to the first threshold or the degree of similarity is less than or equal to the second threshold, the processor 1200 may determine that the target object is not correctly recognized in the reconstructed image.

In an embodiment, when the degree of overlap exceeds the first threshold and the degree of similarity exceeds the second threshold, the processor 1200 may determine that the target object is correctly recognized in the reconstructed image.

A specific embodiment in which the processor 1200 of the device 1000 compares the degree of overlap with the first threshold and compares the degree of similarity with the second threshold to determine whether the target object is correctly recognized will be described in detail with reference to FIG. 6.

In operation S550, the device 1000 determines a compression ratio based on a result of determining whether the target object is recognized. In an embodiment, when it is determined that the target object is not correctly recognized in the reconstructed image, the device 1000 may change the value of the compression ratio to a value lower than the compression ratio used to compress and encode the previously reconstructed image. In an embodiment, when it is determined that the target object is correctly recognized in the reconstructed image, the device 1000 may determine, as a final compression ratio, the compression ratio used to generate the reconstructed image obtained in operation S510. A specific embodiment in which the device 1000 changes a compression ratio or determines a final compression ratio based on a result of determining whether the target object is recognized is described in detail with reference to FIG. 7.

In an embodiment, by performing operation S500 including operations S510 to S550 shown in FIG. 5 with respect to each of a plurality of raw images previously obtained, the device 1000 may obtain information about a compression ratio for correctly recognizing a target object in each of the plurality of raw images. In an embodiment, the device 1000 may store, in the training data storage (1410 of FIG. 3), information about a plurality of feature maps extracted in the process of detecting target objects from a plurality of raw images and a plurality of compression ratio values determined by performing operation S500. In an embodiment, the device 1000 may train the DNN model (1340 of FIG. 3) by using data stored in the training data storage 1410, i.e., data related to a plurality of raw images, a plurality of feature maps, and a plurality of compression ratio values.

Figure 6:
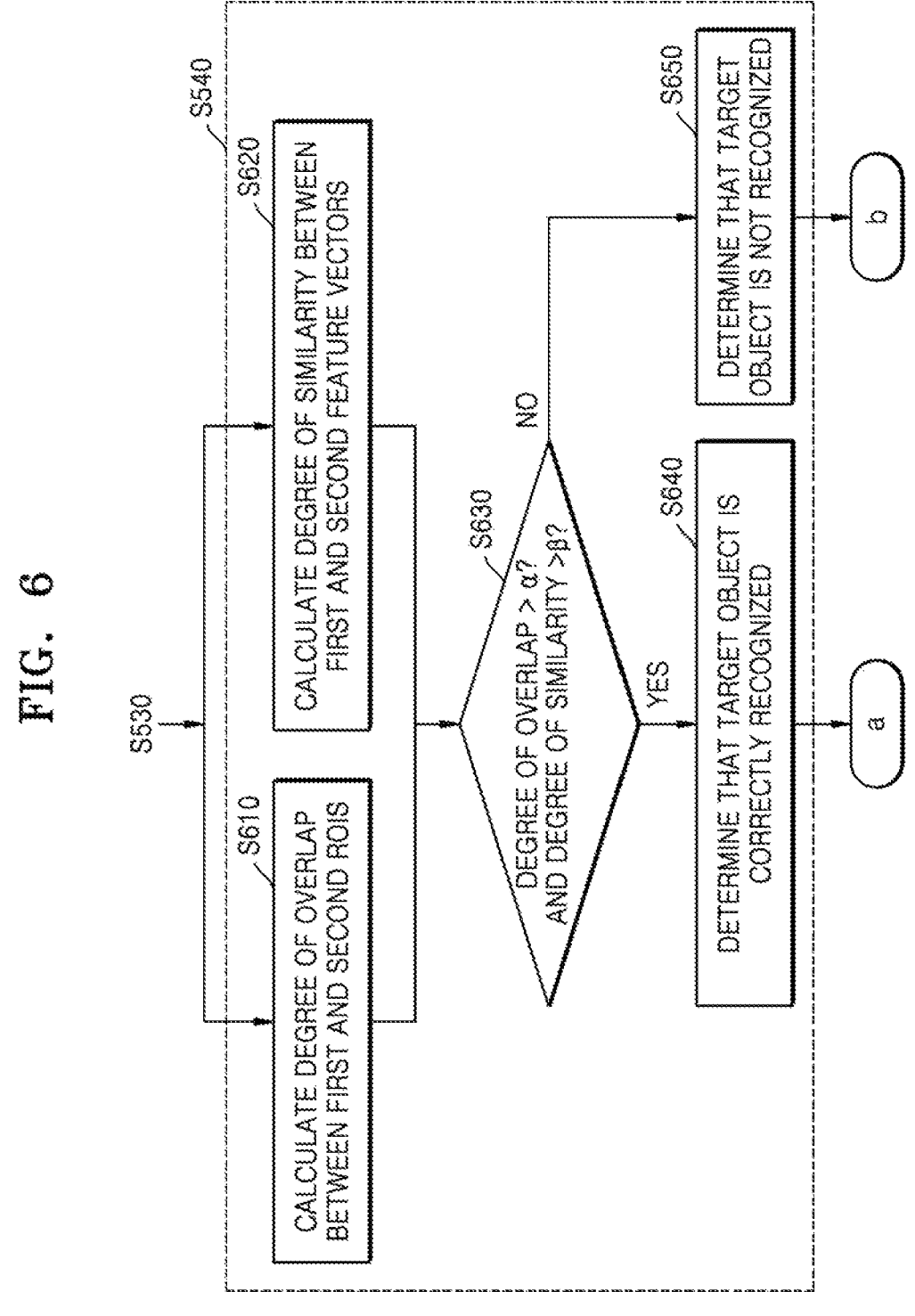
FIG. 6 is a flowchart of a method, performed by a device, of determining whether a target object is recognized in a reconstructed image, according to an embodiment of the present disclosure.

FIG. 6 is a flowchart of a method, performed by the device 1000, of determining whether a target object is recognized in a reconstructed image, according to an embodiment of the present disclosure.

Operations S610 to S650 shown in FIG. 6 are detailed operations of operation S540 shown in FIG. 3. Operations S610 and S620 shown in FIG. 6 are performed after operation S530 shown in FIG. 5 is performed.

In operation S610, the device 1000 calculates a degree of overlap between the first ROI and the second ROI. In an embodiment, the device 1000 may obtain position coordinate value information of a bounding box of the first ROI including the target object detected in the raw image and position coordinate value information of a bounding box of the second ROI including the target object detected in the reconstructed image, and calculate the degree of overlap indicating the degree to which the first and second ROIs overlap by using the obtained position coordinate values. In an embodiment, the processor (1200 of FIG. 3) of the device 1000 may calculate the degree of overlap between the first and second ROIs by using an IoU method for calculating the degree of overlap using position coordinate value information.

In operation S620, the device 1000 calculates a degree of similarity between the first feature vector and the second feature vector. By using a known method for calculating a correlation between vectors, the processor 1200 of the device 1000 may calculate the degree of similarity between the first feature vector extracted from the image of the target object detected in the raw image and the second feature vector extracted from the image of the target object detected in the reconstructed image.

In FIG. 6, operations S610 and S620 may be performed simultaneously and independently. However, the present disclosure is not limited thereto, and operation S610 may be performed before operation S620, or operation S620 may be performed before operation S610.

In operation S630, the device 1000 may compare the degree of overlap calculated in operation S610 with a preset first threshold $\alpha$, and compare the degree of similarity calculated in operation S620 with a preset second threshold $\beta$. For example, the first threshold $\alpha$ may have a value of 0.8 and the second threshold $\beta$ may have a value of 0.5, but the first and second thresholds $\alpha$ and $\beta$ are not limited thereto.

When the degree of overlap exceeds the first threshold $\alpha$ and the degree of similarity exceeds the second threshold $\beta$ (operation S640), the device 1000 determines that the target object is correctly recognized in the reconstructed image. When the target object is correctly recognized in the reconstructed image, the method is connected to (a) of FIG. 7, and after operation S640 of FIG. 6 is performed, operation S710 of FIG. 7 may be performed.

When the degree of overlap is less than or equal to the first threshold $\alpha$ or the degree of similarity is less than or equal to the second threshold $\beta$ (operation S650), the device 1000 determines that the target object is not correctly recognized in the reconstructed image. When the target object is not correctly recognized in the reconstructed image, the method is connected to (b) of FIG. 7, and after operation S650 of FIG. 6 is performed, operation S720 of FIG. 7 may be performed.

Figure 7:
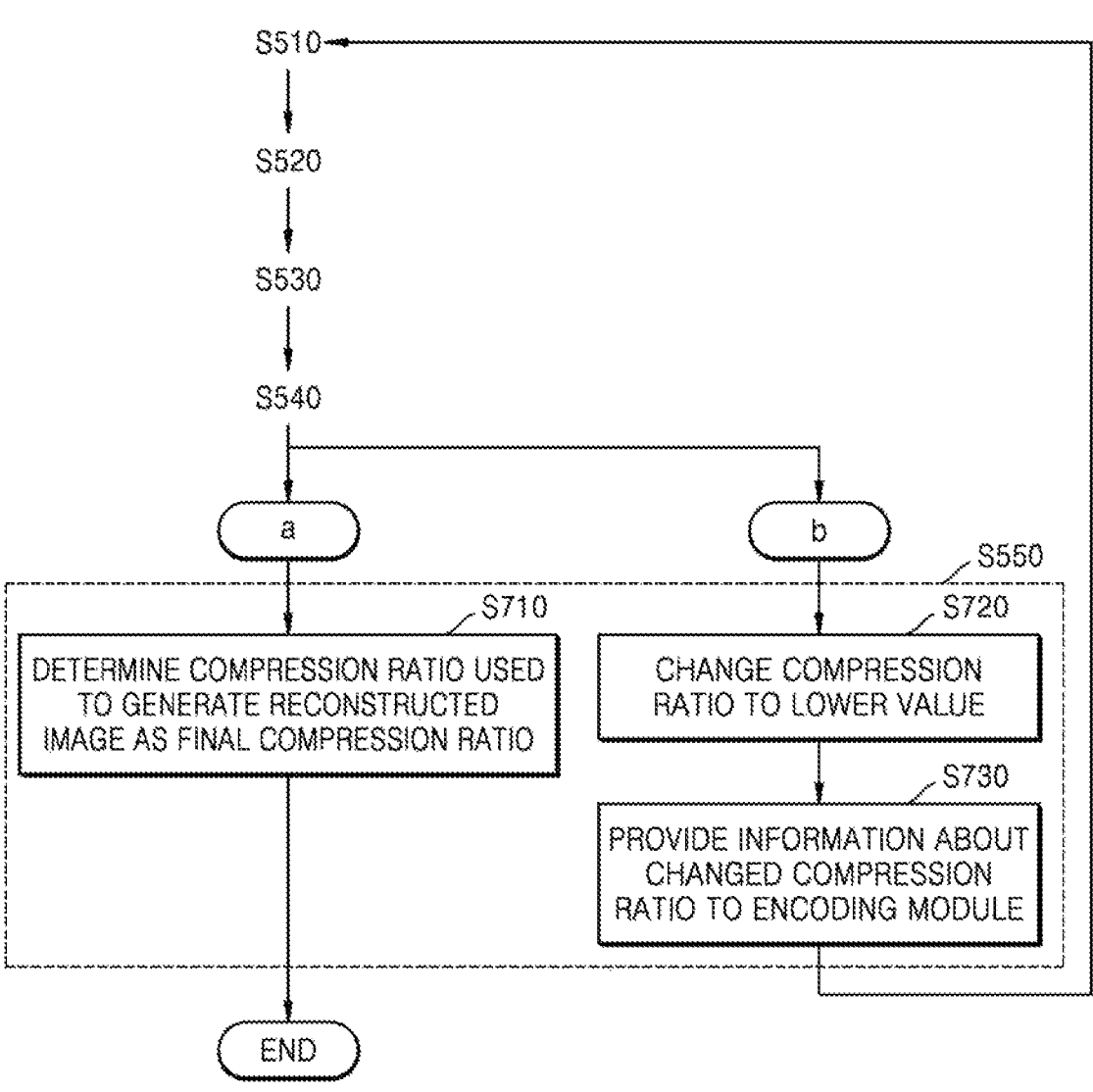
FIG. 7 is a flowchart of a method, performed by a device, of determining a compression ratio of an image based on a result of determining whether a target object is recognized, according to an embodiment of the present disclosure.

FIG. 7 is a flowchart of a method, performed by the device 1000, of determining a compression ratio of an image based on a result of determining whether a target object is recognized, according to an embodiment of the present disclosure.

Operations S710 to S730 shown in FIG. 7 are detailed operations of operation S550 shown in FIG. 5. Operations S510 to S540 shown in FIG. 7 are the same as those shown in FIG. 5.

In operation S710, the device 1000 may determine the compression ratio, e.g., a value of a quantization parameter, used to generate the reconstructed image in operation S510, as a final compression ratio. Operation S710 may be performed after operation S640 of FIG. 6 connected thereto through (a) is performed.

In operation S720, the device 1000 changes the compression ratio to a lower value. Operation S720 may be performed after operation S650 of FIG. 6 connected thereto through (b) is performed. In an embodiment, the device 1000 may adjust the compression ratio to a value lower than the compression ratio used to generate the reconstructed image in operation S510. For example, the processor (1200 of FIG. 3) of the device 1000 may change the value of the quantization parameter used to generate the reconstructed image to a lower value.

In operation S730, the device 1000 provides information about the changed compression ratio to the encoding module (1312 of FIG. 3).

After operation S730, the device 1000 repeats operations S510, S520, S530, S540, and S550. In an embodiment, by executing instructions or program code related to the encoding module 1312, the device 1000 may compress the raw image at the changed compression ratio, encodes the compressed raw image, and decodes the encoded image, thereby generating a reconstructed image. The device 1000 may repeat at least once operations of generating the reconstructed image (operation S510), recognizing the target object in the raw image and extracting the first feature vector from the target object (operation S520), recognizing the target object in the reconstructed image and extracting the second feature vector from the target object (operation S530), determining whether the target object is correctly recognized, based on the degree of overlap and the degree of similarity (operation S540), and determining a compression ratio (operation 550). The device 1000 may repeat operations S510, S520, S530, S540, and S550 until the degree of overlap exceeds the first threshold α and the degree of similarity exceeds the second threshold β.

Figure 8:
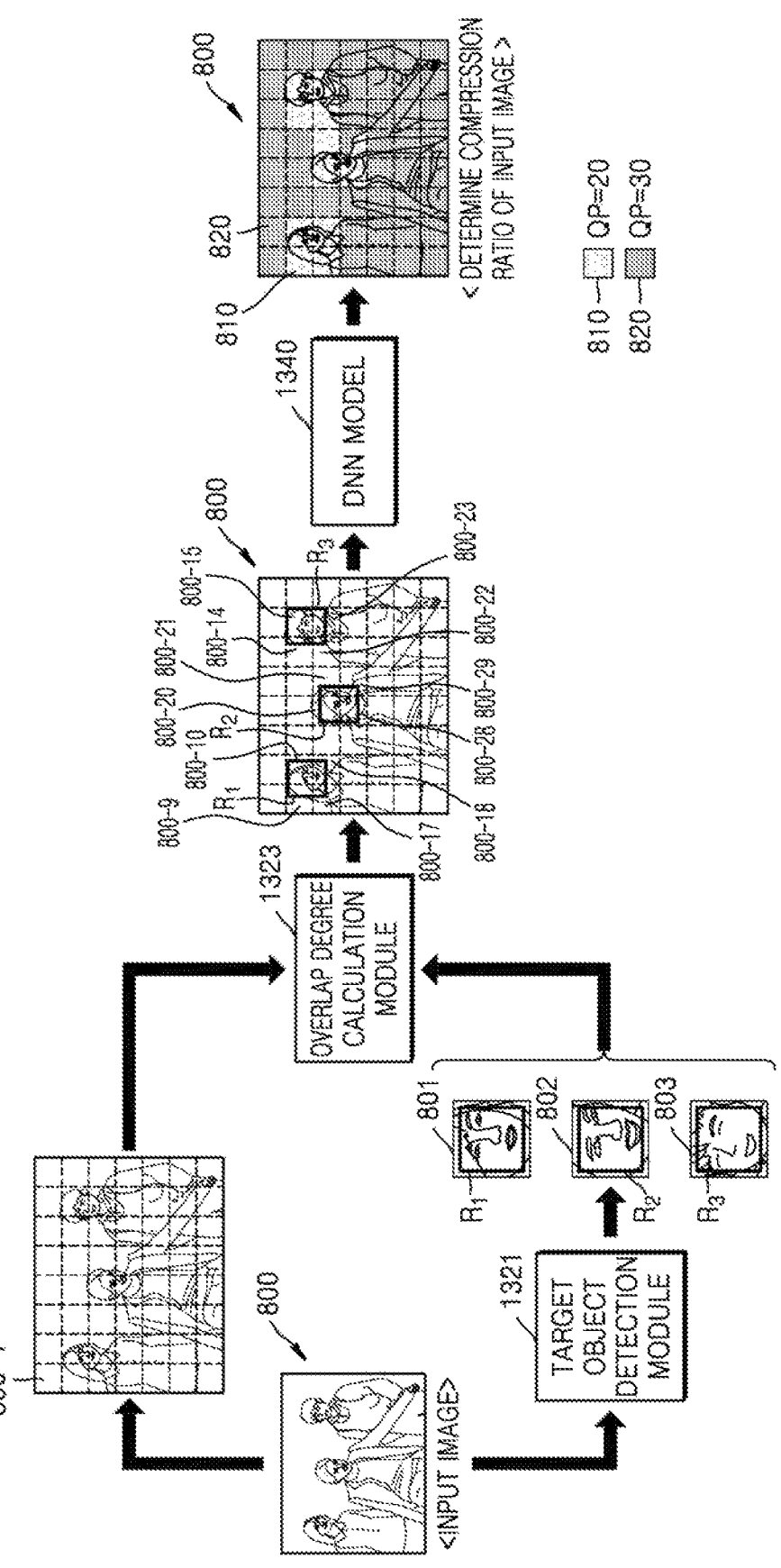
FIG. 8 is a diagram illustrating an embodiment in which a device according to an embodiment of the present disclosure determines a different compression ratio for each coding tree unit (CTU)

FIG. 8 is a diagram illustrating an embodiment in which the device 1000 according to an embodiment of the present disclosure determines a different compression ratio for each CTU.

Referring to FIG. 8, the device 1000 may split an input image 800 in units of a CTU having a preset image size. In an embodiment, each CTU may include a preset number of pixels. For example, each CTU may include 16×16 or 64×64 pixels, and is not limited thereto. The processor (1200 of FIG. 3) of the device 1000 may split the input image 800 into a plurality of CTUs 800-1 to 800-n. Although all of the plurality of CTUs 800-1 to 800-n are illustrated in FIG. 8 as having the same size, the present disclosure is not limited thereto. In an embodiment, the plurality of CTUs 800-1 to 800-n may each include a different number of pixels and have a different size.

The device 1000 may detect a target object in the input image 800. In an embodiment, the processor 1200 of the device 1000 may detect a target object in the input image 800 by executing instructions or program code related to the target object detection module 1321. A 'target object' may include, for example, at least one of a person's face, hairstyle, clothing, and posture, but is not limited thereto. In the embodiment shown in FIG. 8, the target object is a person's face, and the processor 1200 may detect at least one target object 801, 802, and 803 from the input image 800 by using the target object detection module 1321.

The processor 1200 may identify a bounding box of a detected target object and obtain position coordinate values of the identified bounding box. In an embodiment, the processor 1200 may respectively set bounding boxes identified from the at least one target object 801, 802, and 803 to be at least one ROI $R_1$, $R_2$, and $R_3$.

The processor 1200 may identify at least one CTU in which a target object is detected from among the plurality of CTUs 800-1 to 800-n. In an embodiment, by executing instructions or program code related to the overlap degree calculation module 1323, the processor 1200 may calculate a degree of overlap with the plurality of CTUs 800-1 to 800-n by using coordinate information of each of the at least one ROI $R_1$, $R_2$, and $R_3$. In an embodiment, the processor 1200 may calculate the degree of overlap between each of the at least one ROI $R_1$, $R_2$, and $R_3$ and the plurality of CTUs 800-1 to 800-n by using an IoU method for calculating the degree of overlap using coordinate value information. In the calculation of the degree of overlap using the IoU method, an IoU value of 1 means that two images perfectly overlap, and an IoU value of 0 means that the two images do not overlap at all. However, the present disclosure is not limited thereto, and the processor 1200 may use an error calculation method for calculating the degree of overlap by calculating a sum of errors between coordinate values.

The processor 1200 may identify at least one CTU including a target object by identifying, from among the plurality of CTUs 800-1 to 800-n, at least one CTU having a value of a calculated degree of overlap greater than or equal to 0, i.e., at least one CTU that overlaps with an ROI. In the embodiment shown in FIG. 8, the processor 1200 may identify, from among the plurality of CTUs 800-1 to 800-n included in the input image 800, at least one CTU 800-9, 800-10, 800-17, and 800-18 that overlap with the first ROI $R_1$ based on coordinate information (including information about coordinate values and a coordinate size) of the first ROI $R_1$. Similarly, the processor 1200 may identify, from among the plurality of CTUs 800-1 to 800-n, at least one CTU 800-20, 800-21, 800-28, and 800-29 that overlap with the second ROI $R_2$ based on coordinate information of the second ROI $R_2$, and identify at least one CTU 800-14, 800-15, 800-22, and 800-23 that overlap with the third ROI $R_3$ based on coordinate information of the third ROI $R_3$.

The processor 1200 may obtain a compression ratio for correctly recognizing a target object by performing training using, as an input to the DNN model 1340, at least one CTU (800-9, 800-10, 800-14, 800-15, 800-17, 800-18, 800-20, 800-21, 800-22, 800-23, 800-28, and 800-29 in the embodiment shown in FIG. 8), in which a target object is detected from among the plurality of CTUs 800-1 to 800-n. When at least one CTU in which the target object is detected is determined as a first CTU 810, in the embodiment shown in FIG. 8, the device 1000 may determine a compression ratio QP applied to at least one first CTU 810 to be a value of a compression ratio, e.g., 20, output via the DNN model 1340.

The processor 1200 may determine at least one CTU in which the target object is not detected among the plurality of CTUs 800-1 to 800-n as a second CTU 820, and apply a preset initial compression ratio to at least one second CTU 820 instead of the compression ratio output from the DNN model 1340. In the embodiment shown in FIG. 8, the processor 1200 may apply 30, which is a value of an initially set compression ratio QP, to the at least one second CTU 820.

Figure 9:
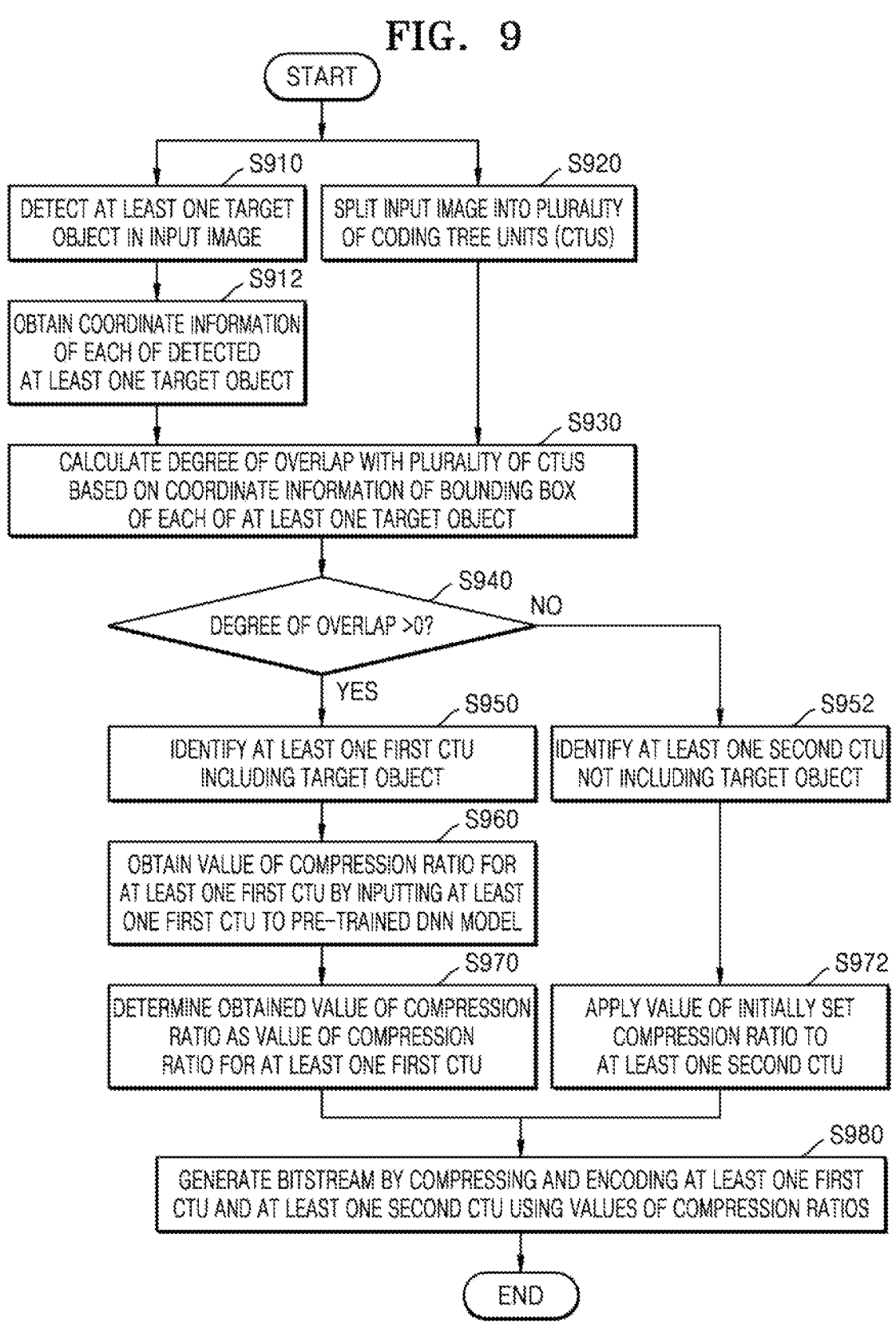
FIG. 9 is a flowchart of a method, performed by a device, of determining a different compression ratio for each CTU, according to an embodiment of the present disclosure.

FIG. 9 is a flowchart of a method, performed by the device 1000, of determining a different compression ratio for each CTU, according to an embodiment of the present disclosure.

In operation S910, the device 1000 detects at least one target object in an input image. A 'target object' may include, for example, at least one of a person's face, hairstyle, clothing, and posture, but is not limited thereto. In an embodiment, the device 1000 may detect a target object in an input image by using a known image processing technique or an AI model including deep learning.

In an embodiment, the processor (1200 of FIG. 3) of the device 1000 may detect a target object in an input image by using a CNN model. The processor 1200 may detect a target object in an input image by using model parameters trained via a CNN model. For example, when the target object is a face, the processor 1200 may detect a person's face in the input image by using a large scale dataset, such as CASIA-WebFace, VGGFace/VGGFace2, or MS-Celeb-1M.

In operation S912, the device 1000 obtains coordinate information of each of the detected at least one target object. In an embodiment, the device 1000 may identify a bounding box of each of the at least one target object detected in the input image, and obtain information about position coordinate values and a coordinate size of the identified bounding box.

In an embodiment, the processor 1200 of the device 1000 may respectively set bounding boxes identified from the at least one target object to be at least one ROI.

In operation S920, the device 1000 splits the input image in units of a CTU. In an embodiment, each CTU may include a preset number of pixels. For example, each CTU may include 16×16 or 64×64 pixels, and is not limited thereto. The processor 1200 of the device 1000 may split the input image into a plurality of CTUs. Each of the plurality of CTUs may have the same size, but is not limited thereto. In an embodiment, the processor 1200 may split the input image into a plurality of CTUs having different sizes.

Operations S910 and S920 may be performed simultaneously and independently. However, the present disclosure is not limited thereto, and operation S910 may be performed before operation S920, or operation S920 may be performed before operation S910.

In operation S930, the device 1000 calculates a degree of overlap with the plurality of CTUs based on coordinate information of a bounding box of each of the at least one target object. In an embodiment, the processor 1200 of the device 1000 may calculate the degree of overlap between a bounding box of each of the at least one target object and the plurality of CTUs by using an IoU method for calculating the degree of overlap using coordinate value information. However, the present disclosure is not limited thereto, and the processor 1200 may use an error calculation method for calculating the degree of overlap by calculating a sum of errors between coordinate values. In the case of using the error calculation method, the processor 1200 may obtain a degree of overlap by calculating errors between position coordinate values of a bounding box of each of the at least one target object and position coordinate values of each of the plurality of CTUs and then calculating the sum of squares of the errors.

In operation S940, the device 1000 identifies whether the calculated degree of overlap exceeds 0. In an embodiment in which the degree of overlap is calculated using the IoU method, when a value of the calculated degree of overlap is 1, it means that two images perfectly overlap, and when a value of the degree of overlap is 0, it means that the two images do not overlap at all. For example, when the value of the degree of overlap is 0.5, it means that two-thirds of the two images overlap.

When the calculated degree of overlap exceeds 0 (operation S950), the device 1000 identifies at least one first CTU including the target object. In an embodiment, the device 1000 may identify at least one first CTU that overlaps with a bounding box of the at least one target object from among the plurality of CTUs. The at least one first CTU may be a CTU corresponding to a region in which the at least one target object is detected.

In operation S960, the device 1000 obtains a value of a compression ratio for the at least one first CTU by inputting the at least one first CTU to a trained DNN model. In an embodiment, the processor 1200 of the device 1000 may input the at least one first CTU to the DNN model (1340 of FIG. 3) composed of trained model parameters, and obtain a value of a compression ratio for correctly recognizing the target object in the at least one first CTU via training of the DNN model 1340.

In operation S970, the device 1000 determines the obtained value of compression ratio as a value of a compression ratio for the at least one first CTU.

When the calculated degree of overlap is 0 (operation S952), the device 1000 identifies at least one second CTU that does not include the target object. In an embodiment, the device 1000 may identify at least one second CTU that does not overlap with the bounding box of the at least one target object from among the plurality of CTUs. The at least one second CTU may be a CTU corresponding to a region in which the at least one target object is not detected. For example, when the target object is a person's face, the at least one second CTU may be a CTU associated with body parts other than the face, such as a person's body, arms, legs, etc., or located in an area corresponding to a background image.

In operation S972, the device 1000 applies a value of an initially set compression ratio to the at least one second CTU. The value of the initially set compression ratio means a value of a compression ratio preset by the encoding module (1312 of FIG. 3). In an embodiment, the value of initially set compression ratio may be determined according to a user input.

In operation S980, the device 1000 generates a bitstream by compressing and encoding the at least one first CTU and the at least one second CTU by using the values of compression ratios. In an embodiment, the device 1000 may compress and encode an image by using the encoder (1310 of FIG. 3). The encoder 1310 may generate a bitstream by compressing and encoding the image by using at least one of video compression standards including, for example, H.264/ AVC and HEVC (H.265). In another embodiment, the encoder 1310 may compress and encode the image by using at least one of still image compression standards including, for example, JPEG, JPEG-2000, JPEG-XR, WebP, etc. The device 1000 may compress the at least one first CTU by applying the value of compression ratio determined in operation S970, and compress the at least one second CTU by using the value of initially set compression ratio applied in operation S972.

In the embodiments shown in FIGS. 8 and 9, the device 1000 may split the input image (800 of FIG. 8) into the plurality of CTUs (800-1 to 800-$n$ of FIG. 8), apply a compression ratio output via the DNN model (1340 of FIG. 3) only to the at least one first CTU (810 of FIG. 8) in which the target object is detected among the plurality of CTUs 800-1 to 800-$n$, and apply an initially set compression ratio to the at least one second CTU (820 of FIG. 8) in which the target object is not detected, thereby improving the accuracy of recognition of the target object. In addition, the at least one second CTU 820 in which the target object is not detected among the plurality of CTUs 800-1 to 800-$n$ is more likely to be a background image of relatively low importance. Therefore, the device 1000 of the present disclosure may not only reduce data storage capacity after compression by compressing CTUs with a higher compression ratio than for the at least one first CTU 810) in which the target object is detected but may also reduce the amount of computation required for compression and encoding and improve the processing speed.

FIG. 10 is a flowchart of a method, performed by the device 1000, of comparing a compression ratio value determined via a DNN model with a compression ratio value determined according to a network bandwidth and an initially set compression ratio value and determining a value of a final compression ratio based on a comparison result, according to an embodiment of the present disclosure.

Operations S1010 to S1070 shown in FIG. 10 are operations performed after operation S420 shown in FIG. 4 is performed. After operation S1070 is performed, operation S430 shown in FIG. 4 may be performed.

In operation S1010, the device 1000 obtains information about a compression ratio value $QP_{NW}$ based on a network bandwidth. In an embodiment, the compression ratio value $QP_{NW}$ may be determined based on a bitrate at which transmission and reception are possible according to a network environment connected to the device 1000, e.g., a network bandwidth). The device 1000 may measure a bandwidth of a network connected to the device 1000 and obtain information about a compression ratio value $QP_{NW}$ according to the measured network bandwidth.

In operation S1020, the device 1000 compares $QP_{det}$ that is a compression ratio value determined by a DNN model and $QP_{init}$ that is an initially set compression ratio value with the compression ratio value $QP_{NW}$ determined according to the network bandwidth. In an embodiment, the device 1000 may compare a compression ratio value $QP_{det}$ output by inputting an image to the DNN model (1340 of FIG. 3) with a compression ratio value $QP_{init}$ initially set by the encoding module (1312 of FIG. 3) and the compression ratio value $QP_{NW}$ according to the network bandwidth obtained in operation S1010.

In operation S1030, the device 1000 identifies whether the compression ratio value $QP_{det}$ determined by the DNN model 1340 is greater than or equal to the initially set compression ratio value $QP_{init}$, and the compression ratio value $QP_{NW}$ determined according to the network bandwidth is less than or equal to the initially set compression ratio value $QP_{init}$.

When $QP_{det}$ is greater than or equal to $QP_{init}$ and $QP_{NW}$ is less than or equal to $QP_{init}$ (operation S1030), the device 1000 determines the compression ratio value $QP_{det}$ output via the DNN model 1340 as a value of a final compression ratio at which an image is to be compressed and encoded (operation S1032). When the compression ratio value $QP_{det}$ determined by the DNN model 1340 is greater than the initially set compression ratio value $QP_{init}$, the target object is recognizable because the compression ratio value $QP_{det}$ for correctly recognizing the target object in the image is greater than the initially set compression ratio value $QP_{init}$, and there is no problem in transmitting a bitstream over the network because the initially set compression ratio value $QP_{init}$ is greater than the compression ratio value $QP_{NW}$ determined according to the network bandwidth, and for these reasons, the device 1000 may determine the compression ratio value $QP_{det}$ determined by the DNN model 1340 as a value of a final compression ratio.

When it is identified that $QP_{det}$ is less than $QP_{init}$ (operation S1040) and $QP_{NW}$ exceeds $QP_{init}$ (operation S1050), the device 1000 determines whether the compression ratio value $QP_{det}$ output via the DNN model 1340 is less than the initially set compression ratio value $QP_{init}$ (operation S1070).

When it is determined that $QP_{det}$ is less than $QP_{init}$ (operation S1040), the device 1000 determines $QP_{det}$ as a compression ratio value for at least one CTU in which the target object is detected among a plurality of CTUs included in the image (operation S1042).

When it is identified that $QP_{det}$ exceeds $QP_{init}$ (operation S1050), the device 1000 determines whether the compression ratio value $QP_{NW}$ determined according to the network bandwidth exceeds the initially set compression ratio value $QP_{init}$ (operation S1052).

When it is determined that $QP_{NW}$ exceeds $QP_{init}$ (operation S1050), the device 1000 determines the compression ratio value $QP_{NW}$ determined according to the network bandwidth as a compression ratio for at least one CTU including the target object (operation S1052). This is because, when $QP_{NW}$ is greater than the $QP_{init}$ which is the initially set compression ratio value, the image needs to be compressed with $QP_{NW}$ which is the compression ratio value according to the network bandwidth in order to transmit a bitstream over the network.

In operation S1060, the device 1000 adjusts a compression ratio value of at least one CTU in which the target object is not detected from among the plurality of CTUs included in the image. Because the compression ratio of the at least one CTU in which the target object is detected is determined as $QP_{det}$ in operation S1042 and determined as $QP_{NW}$ in operation S1052, the device 1000 may adjust the compression ratio value for the at least one CTU in which the target object is not detected in order to compensate for an increased bitrate compared to when compressing the image using the initially set compression ratio value $QP_{init}$. In an embodiment, the device 1000 may change a compression ratio value applied to the at least one CTU in which the target object is not detected among the plurality of CTUs included in the image to a value higher than a previously set compression ratio value.

When $QP_{NW}$ is less than or equal to $QP_{init}$ (operation S1050), the device 1000 determines the initially compression ratio value $QP_{init}$ as a value of a final compression ratio (operation S1070).

In operation S430, the device 1000 generates a bitstream by compressing the image using the determined compression ratio values and encoding the compressed image.

In the embodiment shown in FIG. 10, instead of determining the compression ratio value $QP_{det}$ output via the DNN model 1340 as a final compression ratio for compressing the image, the device 1000 may determine a final compression ratio by taking into account the compression ratio value $QP_{NW}$ obtained according to the network environment (e.g., network bandwidth information) and the initially set compression ratio value $QP_{init}$. Accordingly, the device 1000 of the present disclosure may not only recognize a target object in an image but may also determine a compression ratio of the image by taking into account a bitrate at which transmission and reception are possible according to a network bandwidth.

A program executed by the device 1000 described through the present disclosure may be implemented as a hardware component, a software component, and/or a combination of the hardware component and the software component. A program may be executed by any system capable of executing computer-readable instructions.

Software may include a computer program, a piece of code, an instruction, or a combination of one or more thereof, and may configure a processing device to operate as desired or instruct the processing device independently or collectively.

The software may be implemented as a computer program including instructions stored in computer-readable storage media. Examples of the computer-readable recording media include magnetic storage media (e.g., ROM, RAM, floppy disks, hard disks, etc.), optical recording media (e.g., CD-ROM, digital versatile disks (DVDs), etc.), etc. The computer-readable recording media may be distributed over computer systems connected through a network so that computer-readable code may be stored and executed in a distributed manner. The media may be read by a computer, stored in a memory, and executed by a processor.

A computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium. For example, the 'non-transitory storage medium' may include a buffer in which data is temporarily stored.

Furthermore, programs according to embodiments disclosed in the present specification may be included in a computer program product when provided. The computer program product may be traded, as a product, between a seller and a buyer.

The computer program product may include a software program and a computer-readable storage medium having stored thereon the software program. For example, the computer program product may include a product (e.g., a downloadable application) in the form of a software program electronically distributed by a manufacturer of a device or through an electronic market (e.g., Samsung Galaxy Store). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and the device, the computer program product may include a storage medium of the server or a storage medium of the device. Alternatively, in a case where there is a third device (e.g., a smartphone) communicatively connected to the server or the device, the computer program product may include a storage medium of the third device. Alternatively, the computer program product may include a software program itself that is transmitted from the server to the device or the third device or that is transmitted from the third device to the device.

In this case, one of the server, the device, and the third device may execute the computer program product to perform methods according to embodiments of the disclosure. Alternatively, two or more of the server, the device, and the third device may execute the computer program product to perform the methods according to the embodiments of the disclosure in a distributed manner.

For example, the server may execute the computer program product stored therein to control the device communicatively connected to the server to perform the methods according to the embodiments of the disclosure.

In another example, the third device may execute the computer program product to control the device communicatively connected to the third device to perform the methods according to the embodiments of the disclosure.

In a case where the third device executes the computer program product, the third device may download the computer program product from the server and execute the downloaded computer program product. Alternatively, the third device may execute the computer program product that is pre-loaded therein to perform the methods according to the embodiments of the disclosure.

While the embodiments have been described with reference to limited examples and figures, it will be understood by those of ordinary skill in the art that various modifications and changes in form and details may be made from the above descriptions. For example, adequate effects may be achieved even when the above techniques are performed in a different order than that described above, and/or the aforementioned components such as computer systems or modules are coupled or combined in different forms and modes than those described above or are replaced or supplemented by other components or their equivalents.

What is claimed is:

1. A method of processing an image, the method comprising:

obtaining a feature map for detecting a target object in an image;

predicting a compression ratio for recognizing the target object in the image via a neural network model by inputting the image and the feature map into the neural network model; and generating a bitstream by compressing the image based on the compression ratio and encoding the compressed image, wherein the neural network model that determines a compression ratio for recognizing a reference target object in a training image, is trained based on a degree of overlap between a first region of interest (ROI) including a detected reference target object in the training image and a second ROI including the detected reference target object in a reconstructed image, the degree of overlap being calculated based on first position coordinate values of a bounding box of the first ROI in the training image and second position coordinate values of a bounding box of the second ROI in the reconstructed image, and a degree of similarity between a first feature vector extracted from the reference target object in the training image and a second feature vector extracted from the reference target object in the reconstructed image.

2. The method of claim 1, wherein the neural network model is trained using training data that comprise a plurality of training images, a plurality of feature maps extracted from the plurality of training images, and a plurality of ground-truth compression ratios for recognizing reference target objects respectively in the plurality of training images.

3. The method of claim 2, wherein the training data is generated by:

generating the reconstructed image by compressing the training image at a preset compression ratio, encoding the compressed training image, and decoding the encoded compressed training image, for each of the plurality of training images;

performing an objection detection operation to obtain the detected reference target object in the training image and extracting the first feature vector from the detected reference target object;

performing the object detection operation to obtain the detected reference target object in the reconstructed image and extracting the second feature vector from the detected reference target object in the reconstructed image; and determining a ground-truth compression ratio for recognizing the detected reference target object in the training image, based on the degree of overlap between the first ROI and the second ROI, and the degree of similarity between the first feature vector and the second feature vector.

4. The method of claim 3, wherein the determining of the ground-truth compression ratio comprises:

calculating the degree of overlap between the first ROI and the second ROI;

calculating the degree of similarity between the first feature vector and the second feature vector; and comparing the calculated degree of overlap with a preset first threshold and comparing the calculated degree of similarity with a preset second threshold.

5. The method of claim 4, wherein the determining of the ground-truth compression ratio comprises changing the compression ratio to be lower than the preset compression ratio when the degree of overlap is less than or equal to the first threshold or the degree of similarity is less than or equal to the second threshold as a result of the comparing.

6. The method of claim 4, wherein the determining of the ground-truth compression ratio comprises determining the compression ratio used to generate the reconstructed image as a final compression ratio when the degree of overlap exceeds the first threshold and the degree of similarity exceeds the second threshold.

7. The method of claim 3, wherein the training data is generated further by:

obtaining the plurality of feature maps and information about a plurality of maximum compression ratios; and storing, in a database, the plurality of training images, the plurality of feature maps, and the information about the plurality of maximum compression ratios.

8. The method of claim 1, wherein the neural network model is trained using a training data storage, in which a plurality of first ROIs from a plurality of raw images, a plurality of feature maps from the plurality of raw images, and a plurality of compression ratio values that are determined based on the degree of overlap and the degree of similarity are stored in association with each corresponding raw image.

9. The method of claim 8, wherein, in the training data storage, the plurality of first ROIs, the plurality of feature maps, and the plurality of compression ratio values are stored as key-value pairs, and each key is composed of a corresponding raw image and a corresponding feature map, and each value is a corresponding compression ratio associated with said corresponding raw image.

10. A device for processing an image, the device comprising:

at least one camera;

a communication interface configured to connect the device to a server or another device for data communication;

a memory storing a program including one or more instructions; and a processor configured to execute the one or more instructions of the program stored in the memory to:

receive an image via the at least one camera or the communication interface;

obtain a feature map for detecting a target object in the received image;

predict a compression ratio for recognizing the target object in the image via a neural network model by inputting the image and the feature map to the neural network model; and generate a bitstream by compressing the image using the compression ratio and encoding the compressed image, wherein the neural network model that determines a compression ratio for recognizing a reference target object in a training image, is trained based on a degree of overlap between a first region of interest (ROI) including a detected reference target object in the training image and a second ROI including the detected reference target object in a reconstructed image, the degree of overlap being calculated based on first position coordinate values of a bounding box of the first ROI in the training image and second position coordinate values of a bounding box of the second ROI in the reconstructed image, and a degree of similarity between a first feature vector extracted from the reference target object in the training image and a second feature vector extracted from the reference target object in the reconstructed image.

11. The device of claim 10, wherein the neural network model is trained using training data that comprise a plurality of training images, a plurality of feature maps extracted from the plurality of training images, and a plurality of ground-truth compression ratios for recognizing reference target objects respectively in the plurality of training images.

12. The device of claim 11, wherein model parameters of the neural network model are obtained via a training process based on a loss between a plurality of predicted compression ratios and the plurality of ground-truth compression ratios for the plurality of training images.

13. The device of claim 11, wherein the processor is further configured to:

generate the reconstructed image by compressing the training image at a preset compression ratio, encoding the compressed training image, and decoding the encoded compressed training image, for each of the plurality of training images;

performing an objection detection operation to obtain the detected reference target object in the training image and extract the first feature vector from the detected reference target object;

performing the object detection operation to obtain the detected reference target object in the reconstructed image and extract the second feature vector from the detected reference target object in the reconstructed image; and determine a ground-truth compression ratio for recognizing the detected reference target object in the training image, based on the degree of overlap between the first ROI and the second ROI, and the degree of similarity between the first feature vector and the second feature vector.

14. The device of claim 13, wherein the processor is further configured to calculate the degree of overlap between the first ROI and the second ROI, calculate the degree of similarity between the first feature vector and the second feature vector, and compare the calculated degree of overlap with a preset first threshold and compare the calculated degree of similarity with a preset second threshold.

15. The device of claim 14, wherein the processor is further configured to change the compression ratio to be lower than the preset compression ratio when the degree of overlap is less than or equal to the first threshold or the degree of similarity is less than or equal to the second threshold as a result of the comparing.

16. The device of claim 14, wherein the processor is further configured to determine the compression ratio used to generate the reconstructed image as a final compression ratio when the degree of overlap exceeds the first threshold and the degree of similarity exceeds the second threshold.

17. A non-transitory computer-readable storage medium storing a program that is executable by at least one processor to perform an image processing method comprising:

obtaining a feature map for detecting a target object in an image;

outputting a compression ratio for recognizing the target object in the image by inputting the image and the feature map to a neural network model composed of pre-trained model parameters; and generating a bitstream by compressing the image using the output compression ratio and encoding the compressed image, wherein the neural network model that determines a compression ratio for recognizing a reference target object in a training image, is trained based on a degree of overlap between a first region of interest (ROI) including a detected reference target object in the training image and a second ROI including the detected reference target object in a reconstructed image, the degree of overlap being calculated based on first position coordinate values of a bounding box of the first ROI in the training image and second position coordinate values of a bounding box of the second ROI in the reconstructed image, and a degree of similarity between a first feature vector extracted from the reference target object in the training image and a second feature vector extracted from the reference target object in the reconstructed image.

* * * * *